United States Patent
Kondo et al.

(10) Patent No.: US 9,926,508 B2
(45) Date of Patent: Mar. 27, 2018

(54) IONIC LIQUID, LUBRICANT, AND MAGNETIC RECORDING MEDIUM

(71) Applicant: DEXERIALS CORPORATION, Shinagawa-ku, Tokyo (JP)

(72) Inventors: Hirofumi Kondo, Tokyo (JP); Kouki Hatsuda, Tokyo (JP); Makiya Ito, Tokyo (JP); Nobuo Tano, Tokyo (JP); Kyungsung Yun, Tokyo (JP); Masayoshi Watanabe, Kanagawa (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/308,481

(22) PCT Filed: Apr. 28, 2015

(86) PCT No.: PCT/JP2015/062827
§ 371 (c)(1),
(2) Date: Nov. 2, 2016

(87) PCT Pub. No.: WO2015/182320
PCT Pub. Date: Dec. 3, 2015

(65) Prior Publication Data
US 2017/0058227 A1    Mar. 2, 2017

(30) Foreign Application Priority Data

May 29, 2014 (JP) .................................. 2014-111223

(51) Int. Cl.
| | |
|---|---|
| C10M 105/72 | (2006.01) |
| C10M 135/10 | (2006.01) |
| C10M 105/50 | (2006.01) |
| C10M 105/60 | (2006.01) |
| C10M 105/70 | (2006.01) |
| G11B 5/725 | (2006.01) |

(52) U.S. Cl.
CPC ........ *C10M 105/72* (2013.01); *C10M 105/50* (2013.01); *C10M 105/60* (2013.01); *C10M 105/70* (2013.01); *C10M 135/10* (2013.01); *G11B 5/725* (2013.01); *C10M 2215/04* (2013.01); *C10M 2215/221* (2013.01); *C10M 2215/2203* (2013.01); *C10M 2219/04* (2013.01); *C10M 2219/044* (2013.01); *C10N 2220/04* (2013.01); *C10N 2230/06* (2013.01); *C10N 2240/204* (2013.01)

(58) Field of Classification Search
CPC  C10M 105/72; C10M 105/50; C10M 105/60; C10M 105/70; C10M 135/10; C10M 2215/04; C10M 2215/221; C10M 2215/2203; C10M 2219/04; C10M 2219/044; C10N 2220/04; C10N 2220/204; C10N 2230/06; G11B 5/725
See application file for complete search history.

(56) References Cited

U.S. PATENT DOCUMENTS

| | | | | |
|---|---|---|---|---|
| 2008/0144219 | A1* | 6/2008 | Burns | C10M 169/04 360/135 |
| 2009/0036334 | A1* | 2/2009 | Schwab | C10M 105/56 508/110 |
| 2012/0157360 | A1* | 6/2012 | Massonne | C09K 5/047 508/283 |

FOREIGN PATENT DOCUMENTS

| | | |
|---|---|---|
| JP | 2581090 B2 | 2/1997 |
| JP | 2629725 B2 | 7/1997 |
| JP | 2005-89667 A | 4/2005 |
| JP | 2005-154755 A | 6/2005 |
| JP | 2006-321856 A | 11/2006 |

OTHER PUBLICATIONS

International Search Report (PCT/ISA/210) dated Jul. 14, 2015, by the Japanese Patent Office as the International Searching Authority for International Application No. PCT/JP2015/062827.
Written Opinion (PCT/ISA/237) dated Jul. 14, 2015, by the Japanese Patent Office as the International Searching Authority for International Application No. PCT/JP2015/062827.
Kondo et al., "Novel Lubricants for Magnetic Thin Film Media", Journal of the Magnetics Society of Japan, vol. 13, Supplement, No. S1, 1989, pp. 213-218.
Kondo et al., "Frictional Properties of Novel Lubricants for Magnetic Thin Film Media", IEEE Transactions on Magnetics, vol. 26, No. 5, Sep. 1990, pp. 2691-2693.
Kondo et al., "Comparison of an Amide and Amine Salt as Friction Modifiers for a Magnetic Thin Film Medium", Tribology Transactions, vol. 37, No. 1, 1994, pp. 99-104.
Kondo et al., "Novel Ionic Lubricants for Magnetic Thin Film Media", IEEE Transactions on Magnetics, vol. 49, No. 7, Jul. 2013, pp. 3756-3759.

* cited by examiner

*Primary Examiner* — James Goloboy
(74) *Attorney, Agent, or Firm* — Buchanan, Ingersoll & Rooney PC

(57) ABSTRACT

A lubricant including an ionic liquid, which includes a conjugate acid ($B^+$) and a conjugate base ($X^-$), and is protic, wherein the conjugate acid includes a straight-chain hydrocarbon group having 10 or more carbon atoms, and wherein the conjugate base is represented by the following general formula (1):

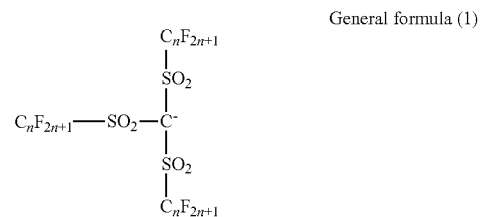

General formula (1)

where n is an integer of from 0 to 6 in the general formula (1).

9 Claims, 5 Drawing Sheets

IONIC LIQUID, LUBRICANT, AND MAGNETIC RECORDING MEDIUM

TECHNICAL FIELD

The present invention relates to a protic ionic liquid, a lubricant containing the ionic liquid, and a magnetic recording medium using the lubricant.

BACKGROUND ART

Conventionally, in a thin film magnetic recording medium, a lubricant is applied onto a surface of a magnetic layer for the purpose of reducing frictions between a magnetic head and the surface of the magnetic recording medium, or reducing abrasion. In order to avoid adhesion, such as sticktion, an actual film thickness of the lubricant is of a molecular order. Accordingly, it is not exaggeration to say that the most important thing for a thin film magnetic recording medium is to select a lubricant having excellent abrasion resistance in any environment.

During a life of a magnetic recording medium, it is important that a lubricant is present on a surface of the medium without causing desorption, spin-off, and chemical deteriorations. Making the lubricant present on a surface of a medium is more difficult, as the surface of the thin film magnetic recording medium is smoother. This is because the thin film magnetic recording medium does not have an ability of replenishing a lubricant as with a coating-type magnetic recording medium.

In the case where an adhesion force between a lubricant and a protective film disposed at a surface of a magnetic layer is weak, moreover, a film thickness of the lubricant is reduced during heating or sliding hence accelerating abrasion. Therefore, a large amount of the lubricant is required. The large amount of the lubricant is the mobile lubricant, and therefore a function of replenishing the lost lubricant can be provided. However, an excessive amount of the lubricant makes the film thickness of the lubricant larger than the surface roughness. Therefore, a problem associated with adhesion arises, and in a crucial case, sticktion arises to cause driving failures. These problems associated with frictions have not been sufficiently solved by conventional perfluoropolyether (PFPE)-based lubricants.

Particularly for a thin film magnetic recording medium having high surface smoothness, a novel lubricant is designed at a molecular level, and synthesized to solve the above-described trade-off. Moreover, there are a number of reports regarding lubricity of PFPE. As described, lubricants are very important in magnetic recording media.

Chemical structures of typical PFPE-based lubricants are depicted in Table 1.

TABLE 1

| Fomblin-based lubricants | |
|---|---|
| | X—$CF_2(OCF_2CF_2)_n(OCF_2)_mOCF_2$—X (0.5 < n/m < 1) |
| Z | X = —$OCF_3$ |
| Z-DOL | X = —$CH_2OH$ |
| Z-DIAC | X = —COOH |
| Z-Tetraol | X = —$CH_2OCH_2CHCH_2OHOH$ |
| AM2001 | X = —$CH_2OCH_2$— 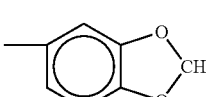 |

| Other lubricants | |
|---|---|
| A20H | $HOCH_2CF_2(OCF_2CF_2)_n(OCF_2)_mOCF_2CH_2O$— 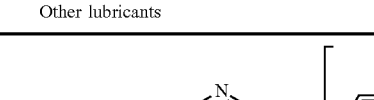 |
| Mono | F—$(CF_2CF_2CF_2O)_1$—$CF_2CF_2CH_2$—$N(C_3H_7)_2$ |

Z-DOL in Table 1 is one of lubricants typically used for thin-film magnetic recording media. Moreover, Z-Tetraol (ZTMD) is a lubricant, in which a functional hydroxyl group is further introduced into a main chain of PFPE, and it has been reported that use of Z-Tetraol enhances reliability of a drive while reducing a space at an interface between a head and a medium. It has been reported that A20H suppresses decomposition of the PFPE main chain with Lewis acid or Lewis base, and improves tribological properties. On the other hand, it has been reported that Mono has a different polymer main chain and different polar groups to those of the PFPE, and the polymer main chain and polar groups of Mono are respectively poly-n-propyloxy, and amine, and Mono reduces adhesion interactions at near contact.

However, a typical solid lubricant, which has a high melting point and is considered thermally stable, disturbs an electromagnetic conversion process that is extremely highly sensitive, and moreover, an abrasion powder scraped by a head is generated on a running track. Therefore, abrasion properties are deteriorated. As described above, the liquid lubricant has mobility that enables to move the adjacent lubricant layer to replenish the lubricant removed due to abrasion by the head. However, the lubricant is span-off from a surface of the disk especially at a high temperature during driving of the disk, because of the mobility of the lubricant, and thus the lubricant is reduced. As a result, a protection function is lost. Accordingly, a lubricant having a high viscosity and low volatility is suitably used, and use of such a lubricant enables to prolong a service life of a disk drive with suppressing an evaporation rate.

Considering the above-described lubricating systems, requirements for a low-friction and low-abrasion lubricant used for thin film magnetic recording media are as follows.
(1) Low volatility.
(2) Low surface tension for a surface filling function.
(3) Interaction between terminal polar groups and a surface of a disk.
(4) High thermal and oxidization stability in order to avoid decomposition or reduction over a service period.
(5) Chemically inactive with metals, glass, and polymers, and no abrasion powder generated from a head or a guide.
(6) No toxicity and no flammability.
(7) Excellent boundary lubricating properties.
(8) Soluble with organic solvents.

Recently, an ionic liquid has been attracted attentions as one of solvents for synthesis of organic or inorganic materials and being friendly to the environments in the fields of electricity storage materials, a separation technology, and a catalyst technology. The ionic liquid is roughly classified as a molten salt having a low melting point. The ionic liquid is typically a molten salt having a melting point of 100° C. or lower, among the above-mentioned molten salts. The important properties of the ionic liquid used as a lubricant are low volatility, inflammability, thermal stability, and an excellent dissolving performance. Accordingly, because of the characteristics of the ionic liquid, the ionic liquid is expected to be applicable as a novel lubricant used in an extreme environment, such as in vacuum, and high temperature. Moreover, known is a technique where a controllability of a transistor is enhanced 100 times a controllability of a conventional transistor by using an ionic liquid in a gate of a single self-assembled quantum dot transistor. In this technique, the ionic liquid forms an electric double layer, which functions as an insulating film of about 1 nm, to thereby obtain a large capacitance.

For example, abrasion and wear of a surface of a metal or ceramic may be reduced by using a certain ionic liquid compared to a conventional hydrocarbon-based lubricant. For example, there is a report that, in the case where an imidazole cation-based ionic liquid is synthesized by substituting with a fluoroalkyl group, and tetrafluoroboric acid salt or hexafluorophosphoric acid salt of alkyl imidazolium is used for steel, aluminium, copper, single crystal $SiO_2$, silicon, or sialon ceramics (Si—Al—O—N), tribological properties more excellent than those of cyclic phosphazene (X-1P) or PFPE are exhibited. Moreover, there is a report that an ammonium-based ionic liquid reduces frictions more than a base oil in the region of elastohydrodynamic to boundary lubrication. Moreover, effects of the ionic liquid as an additive for a base oil have been studied, and a chemical or tribochemical reaction of the ionic liquid has been researched to understand lubricating systems. However, there are almost no application examples of the ionic liquid to magnetic recording media.

Meanwhile, a protic ionic liquid (PIL) is a collective name of a compound formed by a chemical reaction between Bronsted acid and an equivalent amount of Bronsted base. It has been reported that perfluorooctanoic acid alkyl ammonium salt is PIL, and has a significant effect of reducing frictions of a magnetic recording medium compared with the above-mentioned Z-DOL (see PTL 1 and PTL 2, and NPL 1 to NPL 3).

Reported is a lubricant for a magnetic recording medium where thermal stability of the lubricant is enhanced by making a difference ($\Delta$pKa) between pKa of acid and pKa of base large using sulfonic acid ammonium salt (see NPL 4). In this report, it has been confirmed that a mechanism of thermal stability of the lubricant is different depending on a value of $\Delta$pKa, and a weight loss is endothermic and the weight loss occurs due to evaporation in the case where a value of $\Delta$pKa as measured by DG/DTA is small, whereas a weight loss is exothermic and the weight loss is dominantly caused by thermal decomposition in the case where a value of $\Delta$pKa is large.

Meanwhile, the limit of a surface recording density of a hard disk is said to be from 1 Tb/in$^2$ to 2.5 Tb/in$^2$. Currently, a surface recording density of a hard disk is getting closer to the limit, but developments of techniques for large capacities of recording media have been actively performed with reduction in a size of magnetic particles as a premise. As a technique for a large capacity of a recording medium, there are techniques, such as reduction in an effective flying height, and introduction of Single Write (BMP).

As a recording technique of the next generation, moreover, there is "heat assisted magnetic recording." FIG. 3 illustrates a schematic view of heat-assisted magnetic recording. In FIG. 3, reference numeral 1 is laser light, reference numeral 2 is near-field light, reference numeral 3 is a recording head (PMR element), and reference numeral 4 is a reproducing head (TMR element). Examples of a problem of this technique include a deterioration of durability due to evaporation or decomposition of a lubricant present on a surface of a magnetic layer, because a recording area is heated with laser at the time of recording and reproducing. In heat-assisted magnetic recording, a recording medium may be exposed to a high temperature, such as 400° C. or higher, even though it is for a short period. Therefore, thermal stability of a lubricant is concerned, if the lubricant is a typically used lubricant Z-DOL for thin film magnetic recording media, or a carboxylic acid ammonium salt-based lubricant.

CITATION LIST

Patent Literature

PTL 1: Japanese Patent (JP-B) No. 2581090
PTL 2: JP-B No. 2629725

Non Patent Literature

NPL 1: Kondo, H., Seto, J., Haga. S., Ozawa, K., (1989) Novel Lubricants for Magnetic Thin Film Media, Magnetic Soc. Japan, Vol. 13, Suppl. No. 51, pp. 213-218
NPL 2: Kondo, H., Seki, A., Watanabe, H., & Seto, J., (1990). Frictional Properties of Novel Lubricants for Magnetic Thin Film Media, IEEE Trans. Magn. Vol. 26, No. 5, (September 1990), pp. 2691-2693, ISSN: 0018-9464
NPL 3: Kondo, H., Seki, A., & Kita, A., (1994a). Comparison of an Amide and Amine Salt as Friction Modifiers for a Magnetic Thin Film Medium. Tribology Trans. Vol. 37, No. 1, (January 1994), pp. 99-105, ISSN: 0569-8197
NPL 4: Hirofumi Kondo, Makiya Ito, Kouki Hatsuda, Kyungsung Yun, Masayoshi Watanabe, New ionic liquid lubricants for magnetic thin film media IEEE Trans. Magn., 2013, Vol. 49, issue 7, pp. 3756-3759

SUMMARY OF INVENTION

Technical Problem

The present invention aims to solve the above-described various problems in the conventional art, and achieve the following object. Specifically, the present invention has an object to provide an ionic liquid having excellent lubricity even at a high temperature, a lubricant having excellent lubricity even at a high temperature, and a magnetic recording medium having excellent practical properties even at a high temperature.

Solution to Problem

Means for solving the above-described problems are as follows:

<1> A lubricant including:
an ionic liquid, which includes a conjugate acid ($B^+$) and a conjugate base ($X^-$), and is protic,
wherein the conjugate acid includes a straight-chain hydrocarbon group having 10 or more carbon atoms, and
wherein the conjugate base is represented by the following general formula (1):

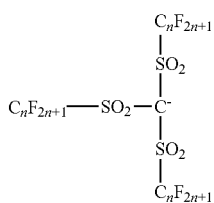

General formula (1)

where n is an integer of from 0 to 6 in the general formula (1).

<2> The lubricant according to <1>,
wherein a base that is a source of the conjugate acid is amine, amidine, guanidine, or imidazole.

<3> The lubricant according to <1> or <2>,
wherein the ionic liquid is represented by any one of the following general formulae (2) to (4):

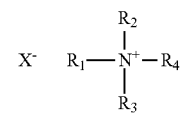

General formula (2)

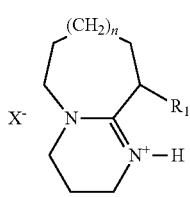

General formula (3)

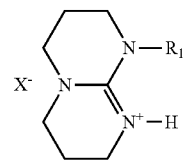

General formula (4)

where, in the general formulae (2) to (4), $X^-$ is the conjugate base represented by the general formula (1),
where $R_1$, $R_2$, $R_3$, and $R_4$ are substituents, and at least one of $R_1$, $R_2$, $R_3$, and $R_4$ is a hydrogen atom and at least one of $R_1$, $R_2$, $R_3$, and $R_4$ is a group including a straight-chain hydrocarbon group having 10 or more carbon atoms in the general formula (2), where $R_1$ is a group including a straight-chain hydrocarbon group having 10 or more carbon atoms, and n is 0 or 1 in the general formula (3), and where $R_1$ is a group including a straight-chain hydrocarbon group having 10 or more carbon atoms in the general formula (4).

<4> The lubricant according to any one of <1> to <3>,
wherein the base that is a source of the conjugate acid is a compound including a primary nitrogen atom, a compound including a secondary nitrogen atom, or a compound including a tertiary nitrogen atom.

<5> The lubricant according to any one of <1> to <4>,
wherein the conjugate base is represented by the following structural formula (1):

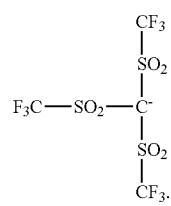

Structural formula (1)

<6> The lubricant according to any one of <1> to <5>,
wherein the hydrocarbon group is an alkyl group.

<7> A magnetic recording medium including:
a non-magnetic support;
a magnetic layer on the non-magnetic support; and
the lubricant according to any one of <1> to <6> on the magnetic layer.

<8> An ionic liquid including:
a conjugate acid ($B^+$); and
a conjugate base ($X^-$),
wherein the conjugate acid includes a straight-chain hydrocarbon group having 10 or more carbon atoms,
wherein the conjugate base is represented by the following general formula (1), and
wherein the ionic liquid is protic,

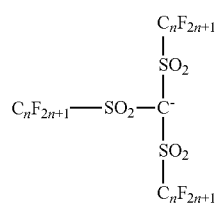

General formula (1)

where n is an integer of from 0 to 6 in the general formula (1).

<9> The ionic liquid according to <8>,
wherein a base that is a source of the conjugate acid is amine, amidine, guanidine, or imidazole.

<10> The ionic liquid according to <8> or <9>,
wherein the ionic liquid is represented by any one of the following general formulae (2) to (4):

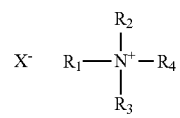

General formula (2)

-continued

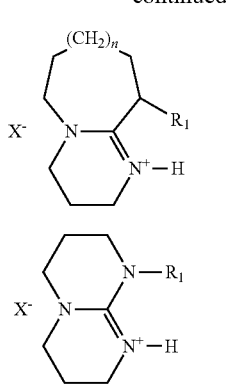

General formula (3)

General formula (4)

where, in the general formulae (2) to (4), X⁻ is the conjugate base represented by the general formula (1), where $R_1$, $R_2$, $R_3$, and $R_4$ are substituents, and at least one of $R_1$, $R_2$, $R_3$, and $R_4$ is a hydrogen atom and at least one of $R_1$, $R_2$, $R_3$, and $R_4$ is a group including a straight-chain hydrocarbon group having 10 or more carbon atoms in the general formula (2), where $R_1$ is a group including a straight-chain hydrocarbon group having 10 or more carbon atoms, and n is 0 or 1 in the general formula (3), and where $R_1$ is a group including a straight-chain hydrocarbon group having 10 or more carbon atoms in the general formula (4).

<11> The ionic liquid according to any one of <8> to <10>, wherein the base that is a source of the conjugate acid is a compound including a primary nitrogen atom, a compound including a secondary nitrogen atom, or a compound including a tertiary nitrogen atom.

<12> The ionic liquid according to any one of <8> to <11>, wherein the conjugate base is represented by the following structural formula (1):

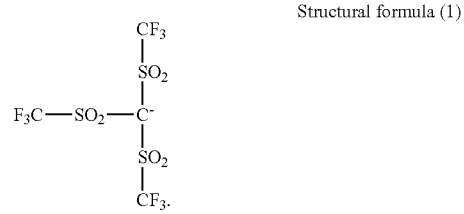 [SMILES: O=S(=O)([C-](S(=O)(=O)C(F)(F)F)S(=O)(=O)C(F)(F)F)C(F)(F)F]

Structural formula (1)

<13> The ionic liquid according to any one of <8> to <12>, wherein the hydrocarbon group is an alkyl group.

Advantageous Effects of the Invention

The present invention can solve the above-described various problems in the conventional art, and can provide an ionic liquid having excellent lubricity even at a high temperature, a lubricant having excellent lubricity even at a high temperature, and a magnetic recording medium having excellent practical properties even at a high temperature.

DESCRIPTION OF EMBODIMENTS

Lubricant and Ionic Liquid

Figure 1:
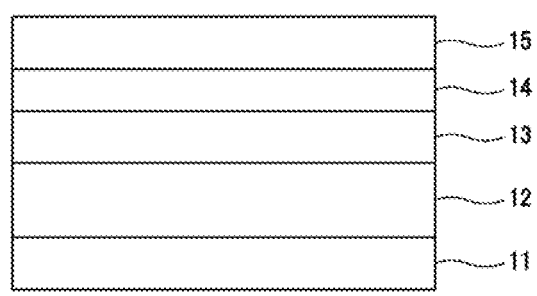
FIG. 1 is a cross-sectional view illustrating one example of a hard disk according to one embodiment of the present invention.

A lubricant of the present invention includes an ionic liquid of the present invention, and may further include other components according to the necessity. The ionic liquid of the present invention includes a conjugate acid (B⁺) and a conjugate base (X⁻).

The conjugate acid contains a straight-chain hydrocarbon group having 10 or more carbon atom.

The conjugate base is represented by the following general formula (1).

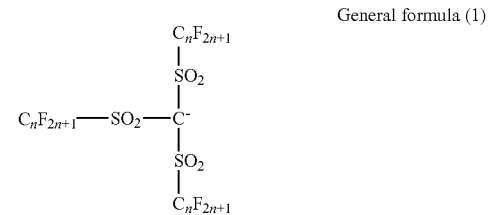

General formula (1)

In the general formula (1), n is an integer of from 0 to 6.

The ionic liquid is protic.

The present inventors have found that high thermal stability can be achieved when a conjugate base in a protic ionic liquid is represented by the general formula (1), and the present invention has been accomplished based on the finding.

The ionic liquid being protic means that the ionic liquid has a proton donor ability, and means, for example, a state where a hydrogen atom is bonded to a cationic atom of the conjugate acid (B⁺).

<Conjugate Acid>

The conjugate acid (B⁺) contains a straight-chain hydrocarbon group having 10 or more carbon atoms.

The upper limit of the number of carbon atoms of the straight-chain hydrocarbon group having 10 or more carbon atoms is not particularly limited, and can be appropriately selected depending on the intended purpose. The number of carbon atoms is preferably 25 or less, and more preferably 20 or less in view of readily availability of raw materials. Since the hydrocarbon group has a long chain, a coefficient of friction can be reduced, and lubricity is therefore improved.

As long as the hydrocarbon group is in the form of a straight chain, the hydrocarbon group may be a saturated hydrocarbon group, or an unsaturated hydrocarbon group containing double bonds at a part, or an unsaturated branched hydrocarbon group partially containing a branched structure. Among them, the hydrocarbon group is preferably an alkyl group, which is a saturated hydrocarbon group, in view of abrasion resistance. Moreover, the hydrocarbon group is also preferably a straight-chain hydrocarbon group that does not have any branch even partially.

The conjugate acid is preferably formed from a base including a straight-chain hydrocarbon group having 10 or more carbon atoms.

A pKa of the base in water is not particularly limited, but preferably 9 or greater.

In the present specification, the pKa is an acid dissociation constant, and is an acid dissociation constant in water.

For example, the acid dissociation constant in water can be measured with reference to a method disclosed in J. Chem. Res., Synop. 1994, 212-213. Specifically, the acid dissociation constant in water can be measured by a combination of a spectrometer and a potential difference measurement.

Examples of the base include a compound including a primary nitrogen atom, a compound including a secondary nitrogen atom, or a compound including a tertiary nitrogen atom.

In the present specification, the term "primary nitrogen atom" means a nitrogen atom bonded only to two hydrogen atoms and one atom other than a hydrogen atom (e.g., a nitrogen atom included in a primary amino group (—$NH_2$ group)).

Moreover, the term "secondary nitrogen atom" means a nitrogen atom bonded only to one hydrogen atom and two atoms other than a hydrogen atom.

Furthermore, the term "tertiary nitrogen atom" means a nitrogen atom bonded only to three atoms other than a hydrogen atom.

In the description above, the "atom other than a hydrogen atom" is not particularly limited, and examples of such an atom include a carbon atom, and a silicon atom.

As the base, moreover, for example, used is a base that is to be a conjugate acid containing positively charged nitrogen, when an ion pair is formed with a conjugate acid and a conjugate base. Examples of such a base include amines, hydroxyl amines, imines, oximes, hydrazines, hydrazones, guanidines, amidines, sulfoamides, imides, amides, thioamides, carbamates, nitriles, ureas, urethanes, and heterocycles. Examples of the heterocycles include pyrrole, indole, azole, oxazole, triazole, tetraazole, and imidazole. Examples of the amines include aliphatic amine, aromatic amine, cyclic amine, amidine, and guanidine. Examples of the aliphatic amine include tertiary aliphatic amine. Examples of the aromatic amine include dimethylaniline, triphenyl amine, and a 4-dimethylaminopyridine derivative. Examples of the cyclic amine include pyrrolidine, 2,2,6,6-tetramethylpiperidine, and a quinuclidine derivative. Examples of the amidine and the guanidine include cyclic amidine, and cyclic guanidine. Specifically, strong base compounds presented in Table 1 can be used, but a structure of the base is not limited to the compounds of Table 1.

Moreover, examples of the base include octadecyl amine ($C_{18}H_{37}NH_2$), methyl octadecyl amine [$C_{18}H_{37}NH(CH_3)$], dimethyl octadecyl amine [$C_{18}H_{37}N(CH_3)_2$], dimethyl decyl amine [$C_{10}H_{21}N(CH_3)_2$], dimethyl tetradecyl amine [$C_{14}H_{29}N(CH_3)_2$], dimethyl eicosyl amine [$C_{20}H_{41}N(CH_3)_2$], dimethyl oleyl amine [$C_{18}H_{35}N(CH_3)_2$], and 2-heptyl undecyl amine [$CH_3(CH_2)_8CH(C_7H_{15})CH_2NH_2$].

Among the above-listed examples, amine, amidine, guanidine, and imidazole are preferable.

In the present specification, "the base that is a source" means a base used for forming a conjugate acid. Among bases formed from conjugate acid, "the base that is a source" is preferably a base having large pKa. For example, the base is preferably amine having large pKa among amines generated by the following formula.

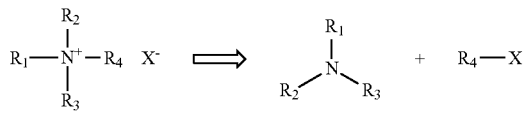

Examples of the conjugate acid include a conjugate acid represented by the following general formula (2-1), a conjugate acid represented by the following general formula (3-1), and a conjugate acid represented by the following general formula (4-1).

General formula (2-1)

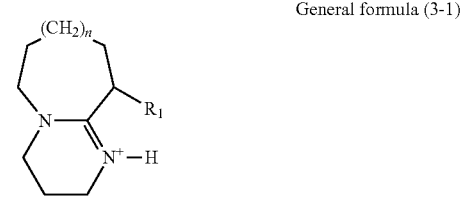
General formula (3-1)

General formula (4-1)

In the general formula (2-1), $R_1$, $R_2$, $R_3$, and $R_4$ are substituents, and at least one of $R_1$, $R_2$, $R_3$, and $R_4$ is a hydrogen atom and at least one of $R_1$, $R_2$, $R_3$, and $R_4$ is a group including a straight-chain hydrocarbon group having 10 or more carbon atoms.

In the general formula (3-1), $R_1$ is a group including a straight-chain hydrocarbon group having 10 or more carbon atoms, and n is 0 or 1.

In the general formula (4-1), $R_1$ is a group including a straight-chain hydrocarbon group having 10 or more carbon atoms.

Note that, the conjugate acids in the general formulae (3-1) and (4-1) may have other resonance structures (canonical structures). Specifically, the conjugate acids can have resonance structures (canonical structures), in which another nitrogen atom is positively charged, and a hydrogen atom is bonded to the nitrogen atom. In the present invention, a conjugate acid having such a resonance structure (a canonical structure) is also included in the conjugate acid represented by the general formula (3-1) and the conjugate acid represented by the general formula (4-1).

Examples of the substituent as $R_1$, $R_2$, $R_3$, and $R_4$ in the general formula (2-1) include an aryl group, a cycloalkyl group, and an alkyl group. Examples of the alkyl group include an alkyl group having from 1 to 20 carbon atoms.

Among $R_1$, $R_2$, $R_3$, and $R_4$, a group other than the group containing a straight-chain hydrocarbon group having 10 or more carbon atoms is preferably an alkyl group having from 1 to 6 carbon atoms.

Examples of the conjugate acid represented by the general formula (2-1) include octadecyl ammonium ($C_{18}H_{37}N^+H_3$), dimethyl octadecyl ammonium [$C_{18}H_{37}N^+H(CH_3)_2$], methyl octadecyl ammonium [$C_{18}H_{37}N^+H_2(CH_3)$], decyl ammonium ($C_{10}H_{21}N^+H_3$), tetradecyl ammonium ($C_{14}H_{29}N^+H_3$), eicosyl ammonium ($C_{20}H_{41}N^+H_3$), oleyl ammonium ($C_{18}H_{35}N^+H_3$), and 2-heptylundecylammonium [$CH_3(CH_2)_8CH(C_7H_{15})CH_2N^+H_3$].

It is however needless to say that the structure of the conjugate acid represented by the general formula (2-1) is not limited to the above-listed examples. For example, a group derived from a heterocyclic compound, an alicyclic compound, or an aromatic compound may be introduced into at least one of $R_1$, $R_2$, $R_3$, and $R_4$. A base that is a source of the conjugate acid can be synthesized, for example, from a base derivative disclosed in Table 1 of non-patent literature (Ivari Kaljurand, Agnes Kutt, Lilli Soovali, Toomas Rodima, Vahur Maemets, Ivo Leito,* and Ilmar A. Koppel, "Extension of the Self-Consistent Spectrophotometric Basicity Scale in Acetonitrile to a Full Span of 28 pKa Units: Unification of Different Basicity Scales" J. Org. Chem. 2005, Vol. 70, pp. 1019-1028).

<Conjugate Base>

The conjugate base is represented by the following general formula (1) and preferably represented by the following structural formula (1).

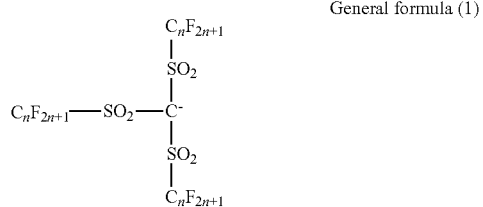

General formula (1)

In the general formula (1), n is an integer of from 0 to 6.

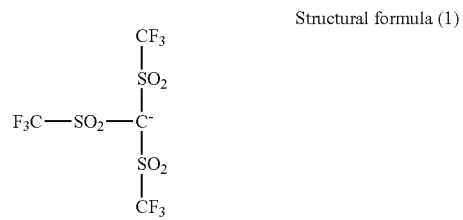

Structural formula (1)

The ionic liquid is preferably represented by any of the following general formulae (2) to (4).

General formula (2)

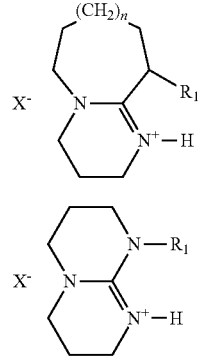

General formla (3)

General formula (4)

In the general formulae (2) to (4), $X^-$ is the conjugate base represented by the general formula (1).

In the general formula (2), $R_1$, $R_2$, $R_3$, and $R_4$ are substituents, and at least one of $R_1$, $R_2$, $R_3$, and $R_4$ is a hydrogen atom and at least one of $R_1$, $R_2$, $R_3$, and $R_4$ is a group including a straight-chain hydrocarbon group having 10 or more carbon atoms.

In the general formula (3), $R_1$ is a group including a straight-chain hydrocarbon group having 10 or more carbon atoms, and n is 0 or 1.

In the general formula (4), $R_1$ is a group including a straight-chain hydrocarbon group having 10 or more carbon atoms.

Note that, the conjugate acids represented by the general formulae (3) and (4) may have other resonance structures (canonical structures). Specifically, the conjugate acids can have resonance structures (canonical structures), in which another nitrogen atom is positively charged, and a hydrogen atom is bonded to the nitrogen atom. In the present invention, a conjugate acid having such a resonance structure (a canonical structure) is also included in the conjugate acids represented by the general formulae (3) and (4).

Examples of the substituents as $R_1$, $R_2$, $R_3$, and $R_4$ in the general formula (2) include an aryl group, a cycloalkyl group, and an alkyl group. Examples of the alkyl group include an alkyl group having from 1 to 20 carbon atoms. Among $R_1$, $R_2$, $R_3$, and $R_4$, a group other than the group including a straight-chain hydrocarbon group having 10 or more carbon atoms is preferably an alkyl group having from 1 to 6 carbon atoms.

A synthesis method of the ionic liquid is not particularly limited, and may be appropriately selected depending on the intended purpose. Examples of the synthesis method include a method where an alkali metal salt of methide and a nitric acid salt of a base are mixed in equivalent amounts to synthesize an ionic liquid.

A synthesis method of the alkali metal salt of methide is not particularly limited and may be appropriately selected depending on the intended purpose. Examples of the synthesis method include a method disclosed in Japanese Patent Application Laid-Open (JP-A) No. 2000-226392.

The ionic liquid may be used alone as the lubricant, or the ionic liquid may be used in combination with a conventional lubricant. Examples of the conventional lubricant include long-chain carboxylic acid, long-chain carboxylic acid ester, perfluoroalkyl carboxylic acid ester, perfluoroalkyl carboxylate, perfluoroalkyl perfluoroalkylcarboxylate, and a perfluoropolyether derivative.

Moreover, an extreme pressure agent may be used in combination at a blending ratio of about 30:70 to 70:30 in a mass ratio in order to maintain a lubricating effect under severe conditions. The extreme pressure agent reacts with a surface of a metal with friction heat generated when the lubricant is partially in contact with the metal in a boundary lubrication region, and forms a coating film of a reaction product. As a result, friction and abrasion are prevented. As the extreme pressure agent, for example, any of a phosphorus-based extreme pressure agent, a sulfur-based extreme pressure agent, a halogen-based extreme pressure agent, an organic metal-based extreme pressure agent, or a complex extreme pressure agent can be used.

Moreover, an anti-rust agent may be optionally used in combination. The anti-rust agent may be any anti-rust agent typically used for this kind of magnetic recording media. Examples of the anti-rust agent include phenols, naphthols, quinones, heterocyclic compounds containing a nitrogen atom, heterocyclic compounds containing an oxygen atom, and heterocyclic compounds containing a sulfur atom. Moreover, the anti-rust agent may be mixed with the lubricant. Alternatively, the anti-rust agent and the lubricant may be deposited as two or more layers by forming a magnetic layer on a non-magnetic support, and applying an anti-rust agent layer on the upper part of the magnetic layer, followed by applying a lubricant layer.

As a solvent of the lubricant, for example, a single use or a combination of alcoholic solvents, such as isopropyl alcohol (IPA), and ethanol, can be used. For example, a mixture of a hydrocarbon-based solvent, such as normal-hexane, and a fluorine-based solvent can be used.

(Magnetic Recording Medium)

A magnetic recording medium of the present invention includes a non-magnetic support, a magnetic layer, and the lubricant of the present invention, and may further include other members according to the necessity.

The magnetic layer is formed on the non-magnetic support.

The lubricant is formed on the magnetic layer.

The lubricant can be applied for so-called a thin film-metal-type magnetic recording medium, in which a magnetic layer formed on a non-magnetic support by a method, such as vapor deposition and sputtering. Moreover, the lubricant can be also applied for a magnetic recording medium having a structure, in which a base layer is disposed between a non-magnetic support and a magnetic layer. Examples of such a magnetic recording medium include a magnetic disk, and a magnetic tape.

FIG. 1 is a cross-sectional view illustrating one example of a hard disk. The hard disk has a structure, in which a substrate 11, a base layer 12, a magnetic layer 13, a protective carbon layer 14, and a lubricant layer 15 are sequentially laminated.

Figure 2:
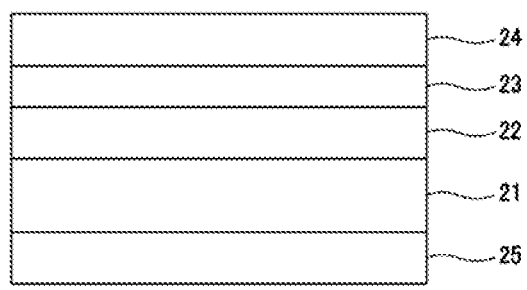
FIG. 2 is a cross-sectional view illustrating one example of a magnetic tape according one embodiment of the present invention.
Figure 3:
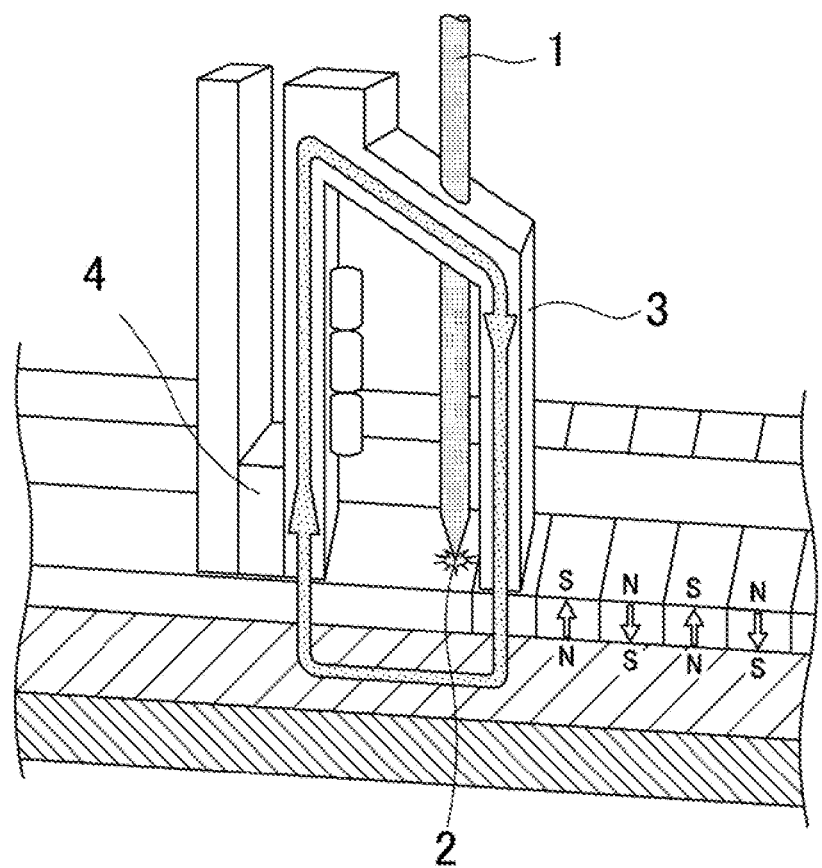
FIG. 3 is a schematic view illustrating heat-assisted magnetic recording.

Moreover, FIG. 2 is a cross-sectional view illustrating one example of a magnetic tape. The magnetic tape has a structure, in which a back-coating layer 25, a substrate 21, a magnetic layer 22, a protective carbon layer 23, and a lubricant layer 24 are sequentially laminated.

In the magnetic disk illustrated in FIG. 1, each of the substrate 11 and the base layer 12 corresponds to the non-magnetic support. In the magnetic tape illustrated in FIG. 2, the substrate 21 corresponds to the non-magnetic support. In the case where a rigid substrate, such as an Al alloy plate, and a glass plate, is used as the non-magnetic support, a surface of the substrate may be made hard by forming an oxidized film, such as anodizing or a Ni—P coating on the surface of the substrate.

Each of the magnetic layers 13 and 22 is formed as a continuous film by a method, such as plating, sputtering, vacuum deposition, and plasma CVD.

Examples of the magnetic layers 13 and 22 include: longitudinal magnetic recording metal magnetic films formed of metals (e.g., Fe, Co, and Ni), Co—Ni-based alloys, Co—Pt-based alloys, Co—Ni—Pt-based alloys, Fe—Co-based alloys, Fe—Ni-based alloys, Fe—Co—Ni-based alloys, Fe—Ni—B-based alloys, Fe—Co—B-based alloys, or Fe—Co—Ni—B-based alloys; and perpendicular magnetic recording metal magnetic thin films, such as Co—Cr-based alloy thin films, and Co—O-based thin films.

In the case where a longitudinal magnetic recording metal magnetic thin film is formed, particularly, a non-magnetic material, such as Bi, Sb, Pb, Sn, Ga, In, Ge, Si, and Tl, is formed as a base layer 12 on a non-magnetic support in advance, and a metal magnetic material is deposited through vapor deposition or sputtering in a perpendicular direction to diffuse the non-magnetic material into the magnetic metal thin film, to thereby improve a coercive force as well as eliminating orientation to assure in-plane isotropy.

Moreover, a hard protective layer 14 or 23, such as a carbon film, a diamond-formed carbon film, a chromium oxide film, and $SiO_2$ film, may be formed on a surface of the magnetic layer 13 or 22.

Examples of a method for applying the above-mentioned lubricant to such a metal thin film magnetic recording medium include a method for top-coating a surface of the magnetic layer 13 or 22, or a surface of the protective layer 14 or 23 with the lubricant, as illustrated in FIGS. 1 and 2. A coating amount of the lubricant is preferably from 0.1 $mg/m^2$ to 100 $mg/m^2$, and more preferably from 0.2 $mg/m^2$ to 3 $mg/m^2$.

As illustrated in FIG. 2, moreover, a metal thin film magnetic tape may optionally have a back-coating layer 25, other than a metal magnetic thin film, which is the magnetic layer 22.

The back-coating layer 25 is formed by adding a carbon-based powder for imparting conductivity, or an inorganic pigment for controlling a surface roughness to a resin binder, and applying the resin binder mixture. In the present embodiment, the above-described lubricant may be internally added to the back-coating layer 25, or applied to the back-coating layer 25 as top coating. Moreover, the above-described lubricant may be internally added to both the magnetic layer 22 and the back-coating layer 25, or applied to both the magnetic layer 22 and the back-coating layer 25 as top coating.

As another embodiment, moreover, the lubricant can be applied for a so-called coating-type magnetic recording medium, in which a magnetic coating film is formed as a magnetic layer by applying a magnetic coating material onto a surface of a non-magnetic support. In the coating-type magnetic recording medium, the non-magnetic support, a magnetic powder constituting the magnetic coating film, and the resin binder for use can be selected from any of those known in the art.

Examples of the non-magnetic support include: polymer substrates formed of polymer materials, such as polyesters, polyolefins, cellulose derivatives, vinyl-based resins, polyimides, polyamides, and polycarbonate; metal substrates formed of aluminium alloys, or titanium alloys; ceramic substrates formed of alumina glass; and glass substrates. Moreover, a shape of the non-magnetic support is not particularly limited, and may be any form, such as a tape, a sheet, and a drum. Furthermore, the non-magnetic support may be subjected to a surface treatment to form fine irregularities in order to control surface properties of the non-magnetic support.

Examples of the magnetic powder include: ferromagnetic iron oxide-based particles, such as $\gamma\text{-Fe}_2\text{O}_3$, cobalt-coated $\gamma\text{-Fe}_2\text{O}_3$; ferromagnetic chromium dioxide; ferromagnetic metal-based particles formed of a metal, such as Fe, Co, and Ni, or an alloy containing any of the above-listed metals; and hexagonal ferrite particles in the form of hexagonal plates.

Examples of the resin binder include: polymers, such as vinyl chloride, vinyl acetate, vinyl alcohol, vinylidene chloride, acrylic acid ester, methacrylic acid ester, styrene, butadiene, and acrylonitrile; copolymers combining two or more selected from the above-listed polymers; polyurethane resins; polyester resins; and epoxy resins. In order to improve dispersibility of the magnetic powder, a hydrophilic polar group, such as a carboxylic acid group, a carboxyl group, and a phosphoric acid group, may be introduced into any of the above-listed binders.

Other than the magnetic powder and the resin binder, additives, such as a dispersing agent, an abrasive, an antistatic agent, and an anti-rust agent, may be added to the magnetic coating film.

As a method for retaining the above-described lubricant in the coating-type magnetic recording medium, there are a method where the lubricant is internally added to the magnetic layer constituting the magnetic coating film formed on the non-magnetic support, a method where the lubricant is applied on a surface of the magnetic layer as top coating, and a combination of the above-listed methods. In the case where the lubricant is internally added into the magnetic coating film, the lubricant is added in an amount of from 0.2 parts by mass to 20 parts by mass relative to 100 parts by mass of the resin binder.

In the case where a surface of the magnetic layer is top-coated with the lubricant, moreover, a coating amount of the lubricant is preferably from 0.1 mg/m$^2$ to 100 mg/m$^2$, and more preferably from 0.2 mg/m$^2$ to 3 mg/m$^2$. As a deposition method in the case where the lubricant is applied as top coating, the ionic liquid is dissolved in a solvent, and the obtained solution may be applied or sprayed, or a magnetic recording medium may be dipped in the solution.

Since the lubricant of the present invention is used, in the present embodiment, an excellent lubricating effect is exhibited to reduce a coefficient of friction, and high thermal stability can be achieved. Moreover, the lubricating effect is not impaired even under severe conditions, such as high temperatures, low temperatures, high humidity, and low humidity.

Accordingly, the magnetic recording medium, to which the lubricant of the present embodiment is applied, exhibits excellent running performances, abrasion resistance, and durability because of a lubricating effect, and can further improve thermal stability.

EXAMPLES

Specific examples of the present invention are explained below. In the examples, ionic liquids were synthesized, and lubricants including the ionic liquids were produced. Then, magnetic disks and magnetic tapes were produced using the lubricants and durability of each disk and durability of each tape were evaluated. Production of a magnetic disk, a durability test of the disk, production of a magnetic tape, and a durability test of the tape were performed in the following manner. Note that, the present invention is not limited to these examples.

<Production of Magnetic Disk>

A magnetic thin film was formed on a glass substrate to produce a magnetic disk as illustrated in FIG. 1, for example, according to International Patent Publication No. WO2005/068589. Specifically, a chemically reinforced glass disk, which was formed of aluminium silicate glass and had an outer diameter of 65 mm, an inner diameter of 20 mm, and a disk thickness of 0.635 mm, was prepared, and a surface of the glass disk was polished so that Rmax of the surface was to be 4.8 nm, and Ra of the surface was to be 0.43 nm. The glass substrate was subjected to ultrasonic cleaning for 5 minutes each in pure water and in isopropyl alcohol (IPA) having the purity of 99.9% or greater, and the washed glass substrate was left to stand in saturated IPA steam for 1.5 minutes, followed by drying. The resultant glass substrate was provided as a substrate 11.

On the substrate 11, a NiAl alloy (Ni: 50 mol %, Al: 50 mol %) thin film in the thickness of 30 nm as a seed layer, a CrMo alloy (Cr: 80 mol %, Mo: 20 mol %) thin film in the thickness of 8 nm as a base layer 12, and a CoCrPtB alloy (Co: 62 mol %, Cr: 20 mol %, Pt: 12 mol %, B: 6 mol %) thin film in the thickness of 15 nm as a magnetic layer 13 were sequentially formed by DC magnetron sputtering.

Subsequently, a 5 nm-thick protective carbon layer 14 formed of amorphous diamond-like carbon was formed by plasma CVD, and the resultant disk sample was subjected to ultrasonic cleaning for 10 minutes in isopropyl alcohol (IPA) having the purity of 99.9% or greater inside a cleaner to remove impurities on a surface of the disk, followed by drying. Thereafter, an IPA solution of an ionic liquid was applied on a surface of the disk by dip coating in the environment of 25° C. and 50% in relative humidity (RH), to form about 1 nm of a lubricant layer 15.

<Disk Durability Test>

A CSS durability test was performed by means of a commercially available strain-gauge-type disk friction-abrasion tester in the following manner. A hard disk was mounted on a rotatable spindle with tightening torque of 14.7 Ncm. Thereafter, a head slider was attached on the hard disk in a manner that a center of an air bearing surface at the inner circumference side of the head slider relative to the hard disk was 17.5 mm from a center of the hard disk. The head used for the measurement was an IBM3370-type inline head, a material of the slider was $Al_2O_3$—TiC, and the head load was 63.7 mN. In the test, the maximum value of friction force was monitored per CSS (contact, start, and stop) in the environment of 100 in cleanliness, 25° C., and 60% RH. The number of times when a coefficient of friction was greater than 1.0 was determined as a result of the CSS durability test. When a result of the CSS durability test was greater than 50,000, the result was represented as ">50,000." Moreover, a CSS durability test was similarly performed after performing a heating test for 3 minutes at a temperature of 300° C., in order to study heat resistance.

<Production of Magnetic Tape>

A magnetic tape having a cross-sectional structure as illustrated in FIG. 2 was produced. First, Co was deposited on a substrate 21 formed of a 5 μm-thick MICTRON (aromatic polyamide) film available from TORAY INDUSTRIES, INC. by oblique deposition to form a magnetic layer 22 formed of a ferromagnetic metal thin film having a film thickness 100 nm. Next, a protective layer 23 formed of a 10 nm-thick diamond-like carbon was formed on a surface of the ferromagnetic metal thin film by plasma CVD, followed by cutting the resultant into a strip having a width of 6 mm. An ionic liquid dissolved in IPA was applied onto the magnetic layer 22 in a manner that a film thickness of the ionic liquid solution was about 1 nm. In this manner, a lubricant layer 24 is formed on the magnetic layer to thereby produce a sample tape.

<Tape Durability Test>

Each sample tape was subjected to a measurement of still durability in an environment having a temperature of −5° C. and in an environment having a temperature of 40° C. and 30% RH, and measurements of a coefficient of friction and shuttle durability in an environment having a temperature of −5° C. and in an environment having a temperature of 40° C. and 90% RH. The still durability was evaluated by a decay time of an output in a paused state decayed by −3 dB. The shuttle resistant was evaluated by the number of shuttles taken until an output was reduced by 3 dB when repeated shuttle run was performed for 2 minutes per time. Moreover, a durability test was similarly performed after performing a heating test for 10 minutes at a temperature of 100° C., in order to study heat resistance.

Example 1

<Synthesis of tris(trifluoromethanesulfonyl)methide-n-octadecyl ammonium salt>

Tris(trifluoromethanesulfonyl)methide-n-octadecyl ammonium salt was synthesized according to the following scheme.

Octadecylamine nitric acid salt that was a raw material was obtained as follows. Octadecylamine was dissolved in heated ethanol, an equimolar nitric acid was dripped in the solution. After confirming that the resultant mixture was neutral, the mixture was cooled to precipitate crystals, and the crystals were dried after collected through filtration. The nitric acid salt (3.3 g) as obtained was dissolved in ethanol. To the solution, a solution obtained by dissolving 4.5 g of a potassium salt of methide in ethanol was added. Thereafter, the resultant mixture was stirred for 1 hour, followed by subjected to heating and reflux for 30 minutes. After removing the solvent from the resultant, ethanol was added, and the organic layer as obtained was washed with water, followed by drying with anhydrous sodium sulfate, to remove ethers. The resultant was subjected to recrystallization using a mixed solvent of n-hexane and ethanol to obtain 6.5 g of colorless crystals. The yield was 95%. The melting point of the crystals was 92.0° C.

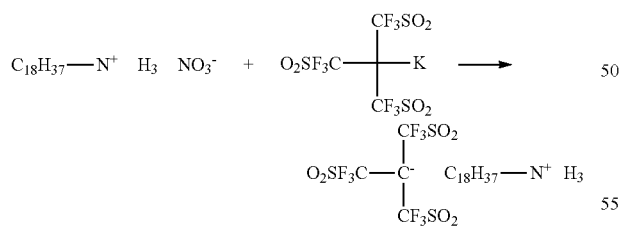

In the present specification, the measurement of FTIR was performed by means of FT/IR-460 available from JASCO Corporation according to a transmission method using KBr plates or KBr pellets. The resolution of the measurement was 4 cm$^{-1}$.

In the TG/DTA measurement, the measurement was performed by means of EXSTAR6000 available from Seiko Instruments Inc. at a temperature range of from 30° C. to 600° C. at a heating rate of 10° C./min with introducing air at a flow rate of 200 mL/min.

The $^1$HNMR spectrum was measured by means of Varian Mercury Plus 300 nuclear magnetic resonance spectrometer (available from Varian, Inc.). A chemical shift of $^1$HNMR was represented with ppm comparing with an internal standard (CDCl$_3$ at 7.24 ppm). Splitting patterns were presented by denoting a singlet as s, a doublet as d, a triplet as t, a multiplet as m, and a broad peak as br.

The $^{13}$C-NMR spectrum was measured by means of Varian Gemini-300 (125 MHz) nuclear magnetic resonance spectrometer (available from Varian, Inc.), and a chemical shift of $^{13}$CNMR was represented with ppm comparing with an internal standard (CDCl$_3$ at 77.0 ppm).

Figure 4:
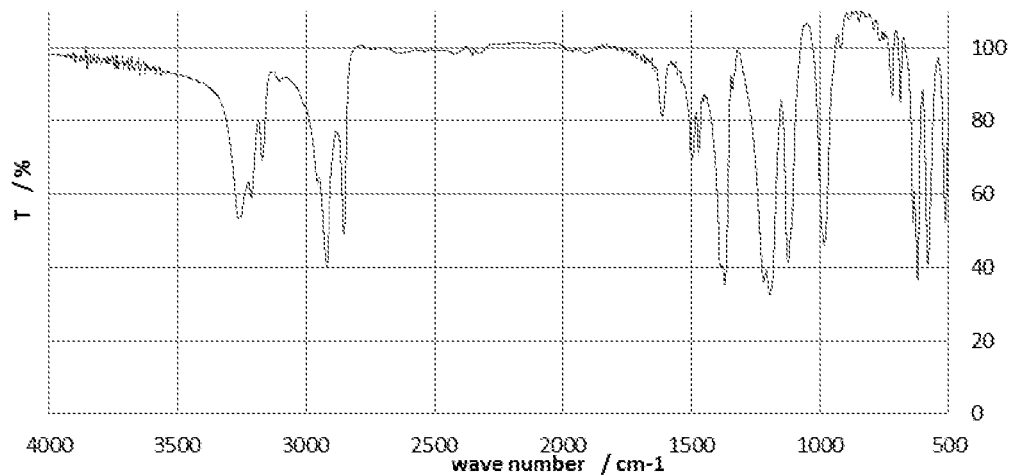
FIG. 4 is the FTIR spectrum of the product of Example 1.

The FTIR spectrum of the product and the assignment are depicted in FIG. 4 and Table 2, respectively.

The symmetric stretching vibrations of SO$_2$ were observed at 1,124 cm$^{-1}$, asymmetric stretching vibrations of SO$_2$ bonds were observed at 1,371 cm$^{-1}$, symmetric stretching vibrations of CF$_3$ were observed at 1,197 cm$^{-1}$ and 1,220 cm$^{-1}$, asymmetric bending vibrations of a NH bond were observed at 1,614 cm$^{-1}$, symmetric stretching vibrations of CH$_2$ were observed at 2,851 cm$^{-1}$, asymmetric stretching vibrations of CH$_2$ were observed at 2,920 cm$^{-1}$, and stretching vibrations of a NH bond were observed at from 3,170 cm$^{-1}$ through 3,263 cm$^{-1}$.

TABLE 2

| Band | Assignment |
| --- | --- |
| 1,124 cm$^{-1}$ | $v_s$**SO$_2$ |
| 1,197 cm$^{-1}$ | $v_s$CF$_3$ |
| 1,220 cm$^{-1}$ | $v_s$CF$_3$ |
| 1,371 cm$^{-1}$ | $v_{as}$SO$_2$ |
| 1,614 cm$^{-1}$ | $\sigma_{as}$***NH$^+$ |
| 2,851 cm$^{-1}$ | $v_a$CH$_2$ |
| 2,920 cm$^{-1}$ | $v_{as}$CH$_2$ |
| 3,170-3,263 cm$^{-1}$ | $v_s$NH$_4^+$ |

Moreover, peaks of the protons ($^1$H)NMR and carbons ($^{13}$C)NMR in deuterated methanol and the assignments are presented below.

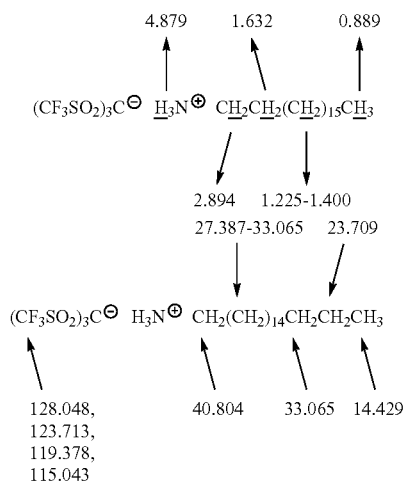

It could be confirmed from the above that tris(trifluoromethanesulfonyl)methide-n-octadecyl ammonium salt was synthesized.

Figure 5:
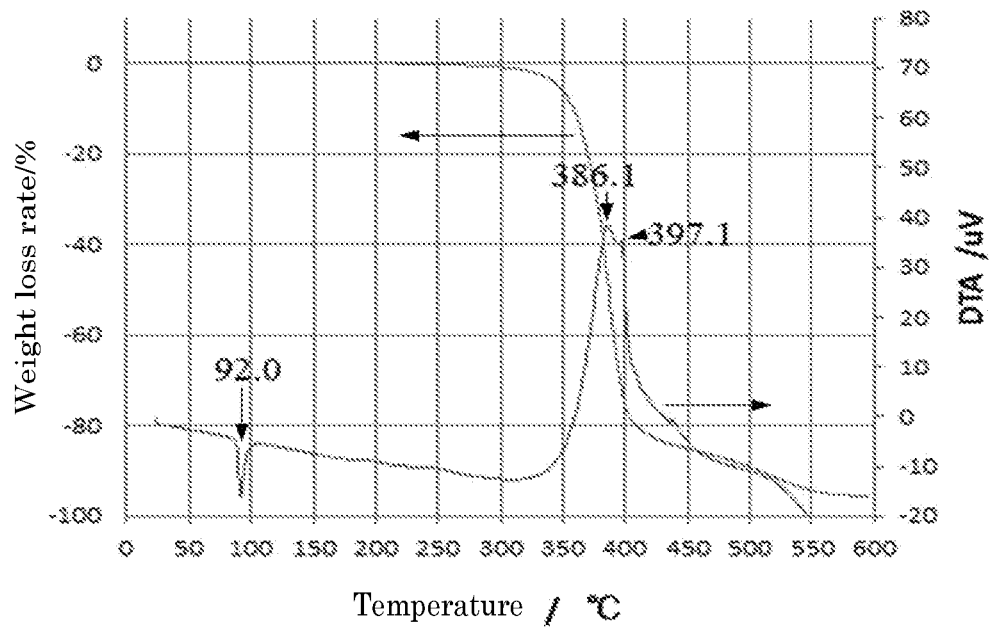
FIG. 5 is the TG/DTA measurement result of the product of Example 1.

Next, the TG/DTA measurement was performed. The TG/DTA measurement result is presented in FIG. 5. The exothermic peak temperatures due to the weight loss were extremely high, i.e., 386.0° C. and 397.1° C. Moreover, it was suggested that it was a decomposition reaction of the compound because the weight loss was exothermic. The exothermic temperatures were improved by 2° C. compared to a perfluorooctanesulfonic acid octadecyl ammonium salt.

Example 2

<Synthesis of tris(trifluoromethanesulfonyl)methide-n-octadecyl TBD salt>

Tris(trifluoromethanesulfonyl)methide-n-octadecyl TBD salt was synthesized according to the following scheme.

First, a synthesis of 7-n-octadecyl-1,5,7-triazabicyclo [4.4.0]-5-decene (octadecyl TBD) that is a raw material is described. The 7-n-octadecyl-1,5,7-triazabicyclo [4.4.0]-5-decene (octadecyl TBD) was synthesized with reference to a method of R. W. Alder et al. (see non-latent literature, Roger W. Alder, Rodney W. Mowlam, David J. Vachon and Gray R. Weisman, "New Synthetic Routes to Macrocyclic Triamines," J. Chem. Sos. Chem. Commun. pp. 507-508 (1992)).

Specifically, sodium hydride (55% by mass hexane) was added at 10° C. to 8.72 g of 1,5,7-triazabicyclo[4.4.0]-5-decene (TBD) dissolved in dry THF, and the resultant mixture was stirred. With maintain the temperature at 10° C., bromooctadecane was added to the mixture by dripping over 20 minutes. Thereafter, the resultant was stirred for 30 minutes at 10° C., followed by stirring for 2 hours at room temperature. Thereafter, the resultant was heated to reflux for 1 hour. The resultant was then returned to room temperature, and an excessive amount of sodium hydride was added to the resultant to allow the mixture to react. After removing the solvent from the reaction mixture, the resultant was subjected to column chromatography using amino-treated silica gel, to thereby obtain a pale yellow target.

The obtained target (4.0 g) was dissolved in ethanol. To the resultant solution, 0.71 cc of 65% by mass nitric acid (d=1.400) was added. After confirming that the resultant mixture was neutralized with litmus paper, an ethanol solution including 4.60 g of tris(trifluoromethanesulfonyl)methide potassium salt was added. After the addition of the solution, the resultant mixture was stirred for 30 minutes, followed by heating to reflux for 30 minutes. After removing the solvent from the resultant, ether was added, and the organic layer was washed with water. Thereafter, the organic layer was dried with anhydrous sodium sulfate to remove the solvent, i.e., ether. The resultant was recrystallized using a mixed solvent of n-hexane and ethanol, to thereby obtain 7.6 g of colorless needle crystals. The yield was 89%.

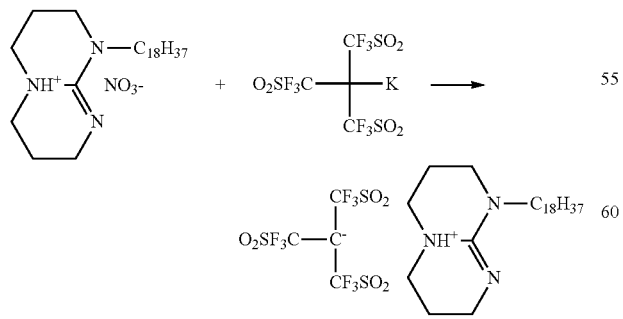

Figure 6:
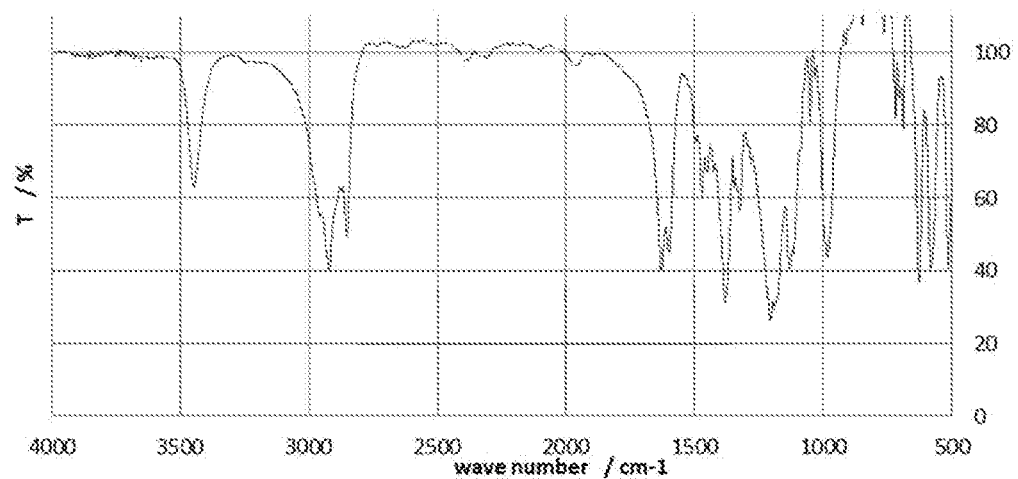
FIG. 6 is the FTIR spectrum of the product of Example 2.

The FTIR spectrum of the product and the assignment are depicted in FIG. 6 and Table 3, respectively.

Symmetric stretching vibrations of $SO_2$ were observed at 1,132 $cm^{-1}$, symmetric stretching vibrations of $CF_3$ were observed at 1,205 $cm^{-1}$, asymmetric stretching vibrations of $SO_2$ bonds were observed at 1,383 $cm^{-1}$, asymmetric bending vibrations of a NH bond were observed at 1,600 $cm^{-1}$, stretching vibrations of C=N were observed at 1,631 $cm^{-1}$, symmetric stretching vibrations of $CH_2$ were observed at 2,852 $cm^{-1}$, asymmetric stretching vibrations of $CH_2$ were observed at 2,920 $cm^{-1}$, and stretching vibrations of a NH bond were observed at 3,447 $cm^{-1}$.

TABLE 3

| Band | Assignment |
| --- | --- |
| 1,132 $cm^{-1}$ | $v_s^{**}SO_2$ |
| 1,205 $cm^{-1}$ | $v_sCF_3$ |
| 1,383 $cm^{-1}$ | $v_{as}SO_2$ |
| 1,600 $cm^{-1}$ | $\sigma_{as}^{***}NH^+$ |
| 1,631 $cm^{-1}$ | $vC=N$ |
| 2,852 $cm^{-1}$ | $v_sCH_2$ |
| 2,920 $cm^{-1}$ | $v_{as}CH2$ |
| 3,447 $cm^{-1}$ | $v_sNH^+$ |

Moreover, peaks of the protons ($^1$H)NMR and carbons ($^{13}$C)NMR in deuterated methanol and the assignments are presented below.

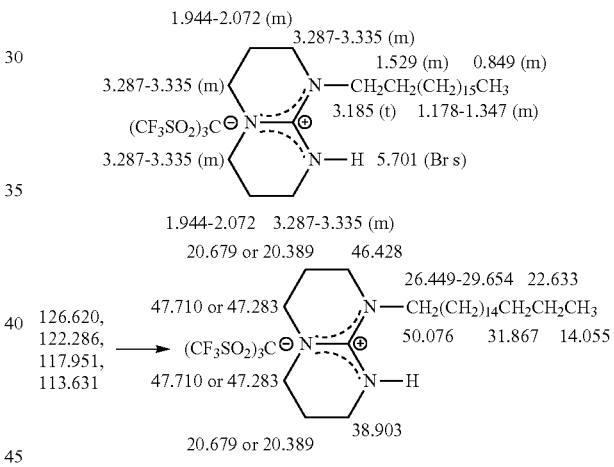

It could be confirmed from the above that tris(trifluoromethanesulfonyl)methide-n-octadecyl TBD salt was synthesized.

Figure 7:
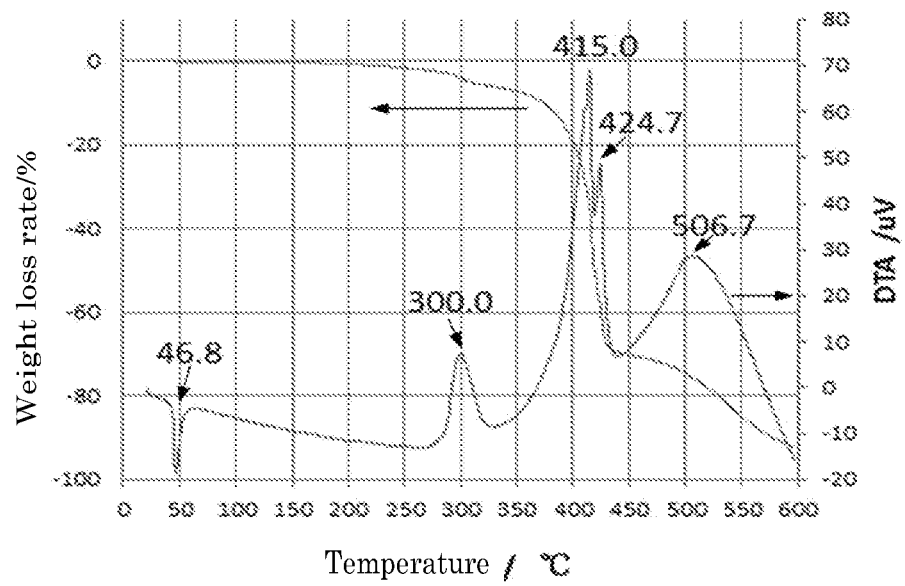
FIG. 7 is the TG/DTA measurement result of the product of Example 2.

Next, the TG/DTA measurement was performed. The TG/DTA measurement result is presented in FIG. 7. The exothermic peak temperatures due to the main weight loss were extremely high, i.e., 415.0° C., 424.7° C., and 506.7° C. Moreover, it was suggested that these were decomposition reactions of the compound because the weight losses were exothermic. The exothermic temperatures were improved by 31° C. compared to a perfluorooctanesulfonic acid octadecyl ammonium salt Example 3

<Synthesis of Tris(Trifluoromethanesulfonyl)methide-N-Octadecyl DBU Salt>

Tris(trifluoromethanesulfonyl)methide-n-octadecyl DBU salt was is synthesized according to the following scheme.

First, synthesis of 6-octadecyl-1,8-diazabicyclo[5.4.0]-7-undecene (octadecyl DBU) is described.

DBU-$C_{18}H_{37}$ was synthesized with reference to the method of Matsumura et al. (see non-patent literature, Noboru Matsumura, Hiroshi Nishiguchi, Masao Okada, and Shigeo Yoneda, "Preparation and Characterization of 6-Substituted 1,8-diazabicyclo[5.4.0]undec-7-ene," J. Heterocyclic Chemistry Vol. 23, Issue 3, pp. 885-887 (1986)).

Specifically, 7.17 g of 1,8-diazabicyclo[5.4.0]-7-undecene (DBU) that was a raw material was dissolved in a tetrahydrofuran (THF) solution, and the resultant solution was cooled down to 0° C. To the solution, 29 cc of n-butyl lithium having a concentration of 1.64 mol/L was added by dripping in an argon gas atmosphere, and the resultant mixture was stirred for 1 hour at 0° C. To the obtained solution, a solution, in which 15.71 g of octadecyl bromide was dissolved in THF, was added by dripping, followed by leaving the resultant mixture for 24 hours with stirring. Note that, THF, which had been prepared by drying in a type 4A molecular sieve, followed by distillation purification, was used immediately after the preparation. After adjusting the resultant mixture to be acidic with hydrochloric acid, the solvent was removed from the mixture, and the resultant was dissolved in hexane. The solution was purified by performing column chromatography using amino-treated silica gel to thereby obtain colorless crystals. The yield was 90%.

The obtained octadecyl DBU (4.0 g) was dissolved in ethanol. To the resultant solution, 0.96 g of 65% by mass nitric acid (d=1.400) was added. After confirming that the resultant mixture was neutralized with litmus paper, an ethanol solution including 4.45 g of tris(trifluoromethanesulfonyl)methide potassium salt was added. After the addition of the solution, the resultant mixture was stirred for 30 minutes, followed by heating to reflux for 30 minutes. After removing the solvent from the resultant, ether was added, and the organic layer was washed with water. Thereafter, the organic layer was dried with anhydrous sodium sulfate to remove the solvent, i.e., ether. The resultant was recrystallized using a mixed solvent of n-hexane and ethanol, to thereby obtain 7.6 g of colorless needle crystals. The melting point of the crystals was 58.6° C. and the yield was 94%.

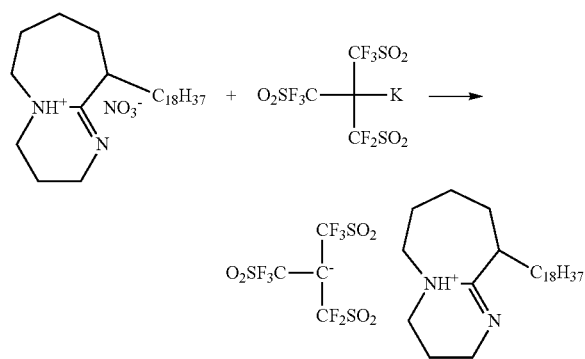

Figure 8:
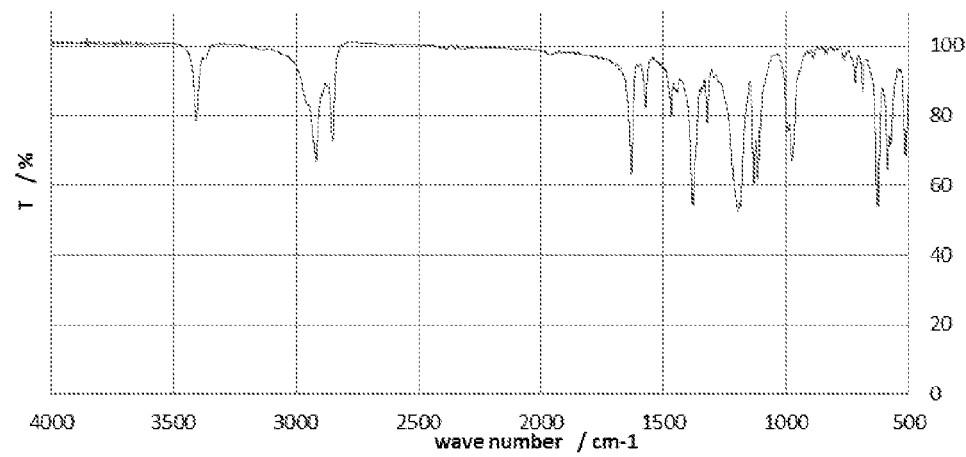
FIG. 8 is the FTIR spectrum of the product of Example 3.

The FTIR spectrum of the product and the assignment are depicted in FIG. 8 and Table 4, respectively.

The symmetric stretching vibrations of $SO_2$ were observed at 1,117 cm$^{-1}$, symmetric stretching vibrations of $CF_3$ were observed at 1,198 cm$^{-1}$, asymmetric stretching vibrations of $SO_2$ bonds were observed at 1,381 cm$^{-1}$, stretching vibrations of C=N were observed at 1,632 cm$^{-1}$, symmetric stretching vibrations of $CH_2$ were observed at 2,850 cm$^{-1}$, asymmetric stretching vibrations of $CH_2$ were observed at 2,918 cm$^{-1}$, and stretching vibrations of a NH bond was observed at 3,408 cm$^{-1}$.

TABLE 4

| Band | Assignment |
| --- | --- |
| 1,117 cm$^{-1}$ | $v_sSO_2$ |
| 1,198 cm$^{-1}$ | $v_sCF_3$ |
| 1,381 cm$^{-1}$ | $v_aSO_2$ |
| 1,632 cm$^{-1}$ | $vC=N$ |
| 2,850 cm$^{-1}$ | $v_aCH_2$ |
| 2,918 cm$^{-1}$ | $v_{as}CH_2$ |
| 3,408 cm$^{-1}$ | $v_sNH^+$ |

Moreover, peaks of the protons ($^1$H)NMR and carbons ($^{13}$C)NMR in deuterated methanol and the assignments are presented below.

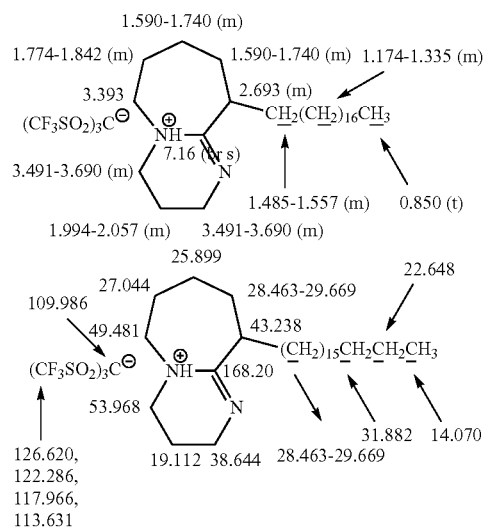

It could be confirmed from the above that tris(trifluoromethanesulfonyl)methide-n-octadecyl DBU salt was synthesized.

Figure 9:
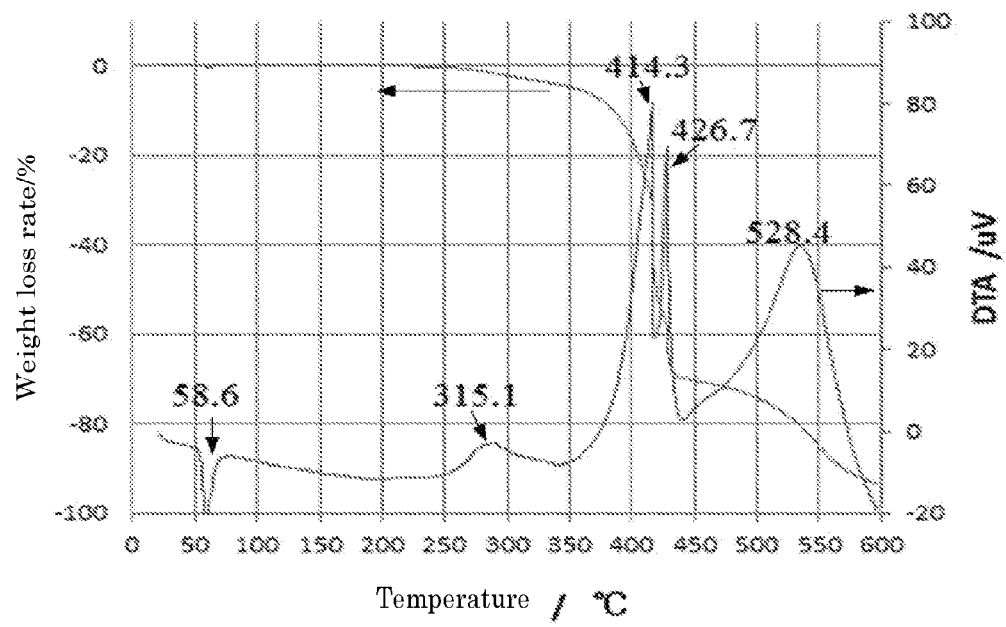
FIG. 9 is the TG/DTA measurement result of the product of Example 3.

Next, the TG/DTA measurement was performed. The TG/DTA measurement result is presented in FIG. 9. The exothermic peak temperatures due to the main weight loss were extremely high, i.e., 414.3° C., 426.7° C., and 528.4° C. Moreover, it was suggested that these were decomposition reactions of the compound because the weight loses were exothermic. The exothermic temperatures were improved by 30° C. compared to a perfluorooctanesulfonic acid octadecyl ammonium salt.

The synthesized ionic liquids are summarized in Table 5 below.

The ionic liquids synthesized in Examples 1 to 3 are referred to as Ionic Liquids 1 to 3, respectively. The melting points, exothermic peak temperatures, 20% weight loss temperature, and 10% weight loss temperature are also presented. As Comparative Example 1, perfluorooctane sulfonic acid octadecyl ammonium salt is listed. As Comparative Example 2, Fomblin Z-DOL is listed. As Comparative Example 3, Z-Tetraol (ZTMD) is listed.

Compared to the perfluorooctane sulfonic acid octadecyl ammonium salt of Comparative Example 1, the exothermic peak temperatures of the Example 1, Example 2, and Example 3 were higher by 3° C., 32° C., and 31° C., respectively. Moreover, the 20% weight loss temperatures were higher by 12° C., 45° C., and 49° C., respectively. The 10% weight loss temperatures were higher by 14° C., 32° C., and 43° C., respectively.

It was found that the ionic liquid of the present invention had extremely is high thermal durability compared to the perfluorooctane sulfonic acid octadecyl ammonium salt, Z-DOL, or other lubricants.

TABLE 5

| Names | Compounds | 20% weight loss temperature/° C. | 10% weight loss temperature/° C. | Exothermic peak temperature/° C. | Melting point/° C. |
|---|---|---|---|---|---|
| Ionic Liquid 1 (Example 1) | tris(trifluoromethanesulfonyl)methide-n-octadecylammonium salt | 369 | 357 | 386, 397 | 92.0 |
| Ionic Liquid 2 (Example 2) | tris(trifluoromethanesulfonyl)methide-n-octadecyl TBD salt | 402 | 375 | 415, 425, 507 | 46.8 |
| Ionic Liquid 3 (Example 3) | tris(trifluoromethanesulfonyl)methide-n-octadecyl DBU salt | 406 | 386 | 414, 427, 528 | 58.6 |
| Comp. Ionic Liquid 1 (Comparative Example 1) | perfluorooctane sulfonic acid octadecyl amine salt | 357 | 343 | 383, 404 | 87.6 |
| Comp. Lubricant 1 (Comparative Example 2) | Z-DOL | 226 | 197 | — | <0 |
| Comparative Lubricant 12 (Comparative Example 3) | Z-Tetraol | 282 | 261 | — | <0 |

Next, durability was studied by using a lubricant using the ionic liquid for a magnetic recording medium.

Example 4

The above-described magnetic disk was produced using a lubricant including tris(trifluoromethanesulfonyl)methide-n-octadecyl ammonium salt, i.e., [Ionic Liquid 1] presented in Table 5. As presented in Table 6, the CSS measurement of the magnetic disk was greater than 50,000 times, and the CSS to measurement of the magnetic disk after the heating test was also greater than 50,000 times. Therefore, the magnetic disk exhibited excellent durability.

Example 5

The above-described magnetic disk was produced using a lubricant including tris(trifluoromethanesulfonyl)methide-n-octadecyl TBD ammonium salt, i.e., [Ionic Liquid 2] presented in Table 5. As presented in Table 6, the CSS measurement of the magnetic disk was greater than 50,000 times, and the CSS measurement of the magnetic disk after the heating test was also greater than 50,000 times. Therefore, the magnetic disk exhibited excellent durability.

Example 6

The above-described magnetic disk was produced using a lubricant including tris(trifluoromethanesulfonyl)methide-n-octadecyl DBU salt, i.e., [Ionic Liquid 3] presented in Table 5. As presented in Table 6, the CSS measurement of the magnetic disk was greater than 50,000 times, and the CSS measurement of the magnetic disk after the heating test was also greater than 50,000 times. Therefore, the magnetic disk exhibited excellent durability.

Comparative Example 4

The above-described magnetic disk was produced using a lubricant including perfluorooctane sulfonic acid octadecyl ammonium salt ($C_8F_{17}SO_3^-H_3N^+C_{18}H_{37}$) of [Comparative Example 1] presented in Table 5. As presented in Table 6, the CSS measurement of the magnetic disk was greater than 50,000 times, and the CSS measurement of the magnetic disk after the heating test was also greater than 50,000 times. There was no significant difference in properties of the disk compared to Examples.

Comparative Example 5

The above-described magnetic disk was produced using a lubricant including Z-DOL of [Comparative Example 2] presented in Table 5. As presented in Table 6, the durability of the magnetic disk measured by the CSS measurement was greater than 50,000 times, but after the heating test, the CSS durability started to deteriorate at 12,000 times. Compared to Examples, the magnetic disk lacked thermal resistance, and therefore it was considered that the durability was deteriorated after the heating.

Comparative Example 6

The above-described magnetic disk was produced using a lubricant including Z-Tetraol of [Comparative Example 3] presented in Table 5. As presented in Table 6, the durability of the magnetic disk measured by the CSS measurement was greater than 50,000 times, but after the heating test, the CSS durability started to deteriorate at 36,000 times. Regarding the thermal resistance, the durability was improved compared with Z-DOL, but the magnetic disk lacked thermal resistance compared to Examples. It was therefore considered that the durability was deteriorated after the heating.

TABLE 6

|  | CSS durability | | CSS durability after heating | |
|---|---|---|---|---|
| Ex. 4 | 25° C., 60% RH | >50,000 | 25° C., 60% RH | >50,000 |
| Ex. 5 | 25° C., 60% RH | >50,000 | 25° C., 60% RH | >50,000 |
| Ex. 6 | 25° C., 60% RH | >50,000 | 25° C., 60% RH | >50,000 |

TABLE 6-continued

|  | CSS durability | | CSS durability after heating | |
|---|---|---|---|---|
| Comp. Ex. 4 | 25° C., 60% RH | >50,000 | 25° C., 60% RH | >50,000 |
| Comp. Ex. 5 | 25° C., 60% RH | >50,000 | 25° C., 60% RH | 12,000 |
| Comp. Ex. 6 | 25° C., 60% RH | >50,000 | 25° C., 60% RH | 36,000 |

As is clear from the descriptions above, the lubricant of the present invention including the ionic liquid of the present invention could maintain excellent lubricity even under the high temperature storage conditions, and moreover could maintain the CSS lubricity over a long period.

Next, examples where Ionic Liquids 1 to 3, Comparative Ionic Liquid 1, and Comparative Lubricants 1 and 2 are applied for magnetic tapes are described.

Example 7

The above-described magnetic tape was produced using a lubricant including Ionic Liquid 1. As presented in Table 7, a coefficient of friction of the magnetic tape after 100 times of the shuttle running was 0.19 in the environment having a temperature of −5° C., and 0.21 in the environment having a temperature of 40° C. and relative humidity of 90%. Moreover, the still durability test was greater than 60 min in the environment having a temperature of −5° C., and greater than 60 min in the environment having a temperature of 40° C. and relative humidity of 30%. Moreover, the shuttle durability test was greater than 200 times in the environment having a temperature of −5° C., and greater than 200 times in the environment having a temperature of 40° C. and relative humidity of 90%. Moreover, a coefficient of friction of the magnetic tape after 100 times of the shuttle running after the heating test was 0.19 in the environment having a temperature of −5° C., and 0.22 in the environment having a temperature of 40° C. and relative humidity of 90%. The still durability test was greater than 60 min in the environment having a temperature of −5° C., and greater than 60 min in the environment having a temperature of 40° C. and relative humidity of 30%. Moreover, the shuttle durability test after the heating test was greater than 200 times in the environment having a temperature of −5° C., and greater than 200 times in the environment having a temperature of 40° C. and relative humidity of 90%. It was found from the results above that the magnetic tape, to which Ionic Liquid 1 had been applied, had excellent abrasion properties, still durability, and shuttle durability.

Example 8

The above-described magnetic tape was produced using a lubricant including Ionic Liquid 2. As presented in Table 7, a coefficient of friction of the magnetic tape after 100 times of the shuttle running was 0.22 in the environment having a temperature of −5° C., and 0.23 in the environment having a temperature of 40° C. and relative humidity of 90%. Moreover, the still durability test was greater than 60 min in the environment having a temperature of −5° C., and greater than 60 min in the environment having a temperature of 40° C. and relative humidity of 30%. Moreover, the shuttle durability test was greater than 200 times in the environment having a temperature of −5° C., and greater than 200 times in the environment having a temperature of 40° C. and relative humidity of 90%. Moreover, a coefficient of friction of the magnetic tape after 100 times of the shuttle running after the heating test was 0.22 in the environment having a temperature of −5° C., and 0.23 in the environment having a temperature of 40° C. and relative humidity of 90%. The still durability test after the heating test was greater than 60 min in the environment having a temperature of −5° C., and greater than 60 min in the environment having a temperature of 40° C. and relative humidity of 30%. Moreover, the shuttle durability test after the heating test was greater than 200 times in the environment having a temperature of −5° C., and greater than 200 times in the environment having a temperature of 40° C. and relative humidity of 90%. It was found from the results above that the magnetic tape, to which Ionic Liquid 2 had been applied, had excellent abrasion properties, still durability, and shuttle durability.

Example 9

The above-described magnetic tape was produced using a lubricant including Ionic Liquid 3. As presented in Table 7, a coefficient of friction of the magnetic tape after 100 times of the shuttle running was 0.21 in the environment having a temperature of −5° C., and 0.21 in the environment having a temperature of 40° C. and relative humidity of 90%. Moreover, the still durability test was greater than 60 min in the environment having a temperature of −5° C., and greater than 60 min in the environment having a temperature of 40° C. and relative humidity of 30%. Moreover, the shuttle durability test was greater than 200 times in the environment having a temperature of −5° C., and greater than 200 times in the environment having a temperature of 40° C. and relative humidity of 90%. Moreover, a coefficient of friction of the magnetic tape after 100 times of the shuttle running after the heating test was 0.21 in the environment having a temperature of −5° C., and 0.22 in the environment having a temperature of 40° C. and relative humidity of 90%. The still durability test after the heating test was greater than 60 min in the environment having a temperature of −5° C., and greater than 60 min in the environment having a temperature of 40° C. and relative humidity of 30%. Moreover, the shuttle durability test after the heating test was greater than 200 times in the environment having a temperature of −5° C., and greater than 200 times in the environment having a temperature of 40° C. and relative humidity of 90%. It was found from the results above that the magnetic tape, to which Ionic Liquid 3 had been applied, had excellent abrasion properties, still durability, and shuttle durability.

Comparative Example 7

The above-described magnetic tape was produced using perfluorooctane sulfonic acid octadecyl ammonium salt that was an ionic liquid. As presented in Table 7, a coefficient of friction of the magnetic tape after 100 times of the shuttle running was 0.20 in the environment having a temperature of −5° C., and 0.23 in the environment having a temperature of 40° C. and relative humidity of 90%. Moreover, the still durability test was greater than 60 min in the environment having a temperature of −5° C., and greater than 60 min in the environment having a temperature of 40° C. and relative humidity of 30%. Moreover, the shuttle durability test was greater than 200 times in the environment having a temperature of −5° C., and greater than 200 times in the environment having a temperature of 40° C. and relative humidity of 90%. However, a coefficient of friction of the magnetic tape after 100 times of the shuttle running after the heating test was 0.23 in the environment having a temperature of −5° C., and increased to 0.26 in the environment having a temperature of 40° C. and relative humidity of 90%. The still durability test after the heating test was greater than 60 min in the environment having a temperature of −5° C., and greater than 60 min in the environment having a temperature of 40° C. and relative humidity of 30%. Moreover, the shuttle durability test after the heating test was greater than 200 times in the environment having a temperature of −5° C., and greater than 200 times in the environment having a temperature of 40° C. and relative humidity of 90%. It was found from the results above that the magnetic tape, to which Comparative Ionic Liquid 1 had been applied, had excellent still durability and shuttle durability, but the coefficient of friction increased after the heating test.

Comparative Example 8

The above-described magnetic tape was produced using a lubricant including Comparative Example 2. As presented in Table 7, a coefficient of friction of the magnetic tape after 100 times of the shuttle running was 0.25 in the environment having a temperature of −5° C., and 0.30 in the environment having a temperature of 40° C. and relative humidity of 90%. Moreover, the still durability test was 12 min in the environment having a temperature of −5° C., and 48 min in the environment having a temperature of 40° C. and relative humidity of 30%. Moreover, the shuttle durability test was 59 times in the environment having a temperature of −5° C., and 124 times in the environment having a temperature of 40° C. and relative humidity of 90%. Moreover, a coefficient of friction of the magnetic tape after 100 times of the shuttle running after the heating test was 0.32 in the environment having a temperature of −5° C., and increased to 0.35 in the environment having a temperature of 40° C. and relative humidity of 90%. The still durability test after the heating test was 12 min in the environment having a temperature of −5° C., and 15 min in the environment having a temperature of 40° C. and relative humidity of 30%. Moreover, the shuttle durability test after the heating test was 46 times in the environment having a temperature of −5° C., and 58 times in the environment having a temperature of 40° C. and relative humidity of 90%. It was found from the results above that the magnetic tape, to which the compound of Comparative Example 2 had been applied, had a high coefficient of friction, and significant deteriorations in still durability and shuttle durability.

Comparative Example 9

The above-described magnetic tape was produced using a lubricant including the compound of Comparative Example 3. As presented in Table 7, a coefficient of friction of the magnetic tape after 100 times of the shuttle running was 0.22 in the environment having a temperature of −5° C., and 0.26 in the environment having a temperature of 40° C. and relative humidity of 90%. Moreover, the still durability test was 25 min in the environment having a temperature of −5° C., and 35 min in the environment having a temperature of 40° C. and relative humidity of 30%. Moreover, the shuttle durability test was 65 times in the environment having a temperature of −5° C., and 156 times in the environment having a temperature of 40° C. and relative humidity of 90%. As mentioned, the durability was improved compared to Comparative Example 2 but specifications of magnetic tapes were not satisfied. Moreover, a coefficient of friction of the magnetic tape after 100 times of the shuttle running after the heating test was 0.28 in the environment having a temperature of −5° C., and increased to 0.32 in the environment having a temperature of 40° C. and relative humidity of 90%. The still durability test after the heating test was 23 min in the environment having a temperature of −5° C., and 31 min in the environment having a temperature of 40° C. and relative humidity of 30%. Moreover, the shuttle durability test after the heating test was 55 times in the environment having a temperature of −5° C., and 126 times in the environment having a temperature of 40° C. and relative humidity of 90%. It was found from the results above that the magnetic tape, to which the lubricant Z-Tetraol of Comparative Example 3 had been applied, had a high coefficient of friction, and significant deteriorations in still durability and shuttle durability, compared to Examples.

TABLE 7

| | | Coefficient of friction after 100 running | | Still durability/ min | | Shuttle durability/ times | | Still durability after heating/ min | | Coefficient of friction after 100 running | | Shuttle durability after heating/ times | |
|---|---|---|---|---|---|---|---|---|---|---|---|---|---|
| Ex. 7 | | −5° C. | 0.19 | −5° C. | >60 | −5° C. | >200 | −5° C. | 0.19 | −5° C. | >60 | −5° C. | >200 |
| | | 40° C., 90% RH | 0.21 | 40° C., 30% RH | >60 | 40° C., 90% RH | >200 | 40° C., 90% RH | 0.22 | 40° C., 30% RH | >60 | 40° C., 90% RH | >200 |
| Ex. 8 | | −5° C. | 0.22 | −5° C. | >60 | −5° C. | >200 | −5° C. | 0.22 | −5° C. | >60 | −5° C. | >200 |
| | | 40° C., 90% RH | 0.23 | 40° C., 30% RH | >60 | 40° C., 90% RH | >200 | 40° C., 90% RH | 0.23 | 40° C., 30% RH | >60 | 40° C., 90% RH | >200 |
| Ex. 9 | | −5° C. | 0.21 | −5° C. | >60 | −5° C. | >200 | −5° C. | 0.21 | −5° C. | >60 | −5° C. | >200 |
| | | 40° C., 90% RH | 0.21 | 40° C., 30% RH | >60 | 40° C., 90% RH | >200 | 40° C., 90% RH | 0.22 | 40° C., 30% RH | >60 | 40° C., 90% RH | >200 |
| Comp. Ex. 7 | | −5° C. | 0.20 | −5° C. | >60 | −5° C. | >200 | −5° C. | 0.23 | −5° C. | >60 | −5° C. | >200 |
| | | 40° C., 90% RH | 0.23 | 40° C., 30% RH | >60 | 40° C., 90% RH | >200 | 40° C., 90% RH | 0.26 | 40° C., 30% RH | >60 | 40° C., 90% RH | >200 |
| Comp. Ex. 8 | | −5° C. | 0.25 | −5° C. | 12 | −5° C. | 59 | −5° C. | 0.32 | −5° C. | 12 | −5° C. | 46 |
| | | 40° C., 90% RH | 0.30 | 40° C., 30% RH | 48 | 40° C., 90% RH | 124 | 40° C., 90% RH | 0.35 | 40° C., 30% RH | 15 | 40° C., 90% RH | 58 |
| Comp. Ex. 9 | | −5° C. | 0.22 | −5° C. | 25 | −5° C. | 65 | −5° C. | 0.28 | −5° C. | 23 | −5° C. | 55 |
| | | 40° C., 90% RH | 0.26 | 40° C., 30% RH | 35 | 40° C., 90% RH | 156 | 40° C., 90% RH | 0.32 | 40° C., 30% RH | 31 | 40° C., 90% RH | 126 |

It was also evident from the results above that the magnetic tape, to which the lubricant of the present invention including the ionic liquid of the present invention had been applied, exhibited excellent abrasion resistance, still durability, and shuttle durability. In case of Z-DOL or Z-Tetraol as Comparative Example, however, deterioration in the durability was significant similarly to the case of the above-described disk. In case of the lubricant including perfluorooctane sulfonic octadecyl ammonium salt, moreover, the magnetic tape had excellent durability, but the coefficient of friction increased after the heating.

As is clear from the explanations above, the lubricant including an ionic liquid, which contains a conjugate acid ($B^+$) and a conjugate base ($X^-$) and is protic, where the conjugate acid includes a straight-chain hydrocarbon group having 10 or more carbon atoms, and the conjugate base is represented by the general formula (1), can maintain lubricity even under high temperature conditions, and can maintain lubricity over a long period. Accordingly, a magnetic recording medium using the lubricant including the ionic liquid had extremely excellent running performances, abrasion resistance, and durability.

REFERENCE SIGNS LIST 11 substrate
12 base layer
13 magnetic layer
14 protective carbon layer
15 lubricant layer
21 substrate
22 magnetic layer
23 protective carbon layer
24 lubricant layer
25 back-coating layer

The invention claimed is:

1. A lubricant comprising:
an ionic liquid, which includes a conjugate acid ($B^+$) and a conjugate base ($X^-$), and is protic,
wherein the ionic liquid is represented by any one of the following general formulae (2) to (4), and
wherein the conjugate base is represented by the following general formula (1):

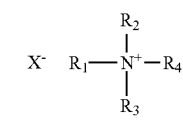

General formula (2)

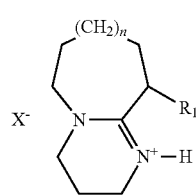

General formula (3)

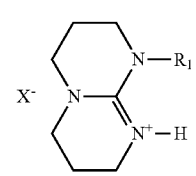

General formula (4)

where, in the general formulae (2) to (4), $X^-$ is the conjugate base represented by the general formula (1), where three of $R_1$, $R_2$, $R_3$, and $R_4$ is a hydrogen atom, and other one of $R_1$, $R_2$, $R_3$, and $R_4$ is a group including a straight-chain hydrocarbon group having 10 or more carbon atoms in the general formula (2), where $R_1$ is a group including a straight-chain hydrocarbon group having 10 or more carbon atoms, and n is 0 or 1 in the general formula (3), and where $R_1$ is a group including a straight-chain hydrocarbon group having 10 or more carbon atoms in the general formula (4)

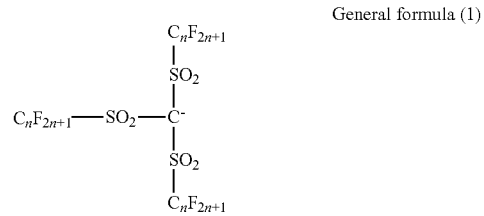

General formula (1)

where n is an integer of from 0 to 6 in the general formula (1).

2. The lubricant according to claim 1,
wherein the conjugate base is represented by the following structural formula (1):

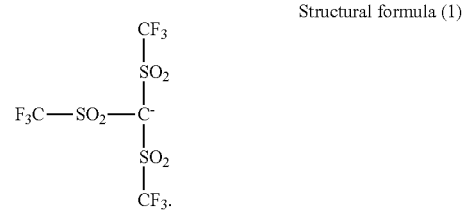 [SMILES: O=S(=O)([C-](S(=O)(=O)C(F)(F)F)S(=O)(=O)C(F)(F)F)C(F)(F)F]

Structural formula (1)

3. The lubricant according to claim 1,
wherein the hydrocarbon group is an alkyl group.

4. A magnetic recording medium comprising:
a non-magnetic support;
a magnetic layer on the non-magnetic support; and
the lubricant according to claim 1 on the magnetic layer.

5. An ionic liquid comprising:
a conjugate acid ($B^+$); and
a conjugate base ($X^-$),
wherein the ionic liquid is represented by any one of the following general formulae (2) to (4),
wherein the conjugate base is represented by the following general formula (1), and
wherein the ionic liquid is protic,

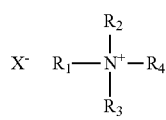

General formula (2)

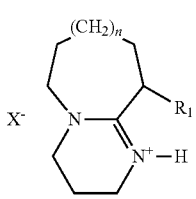

General formula (3)

-continued

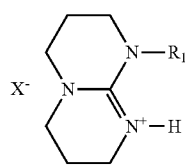
General formula (4)

where, in the general formulae (2) to (4), $X^-$ is the conjugate base represented by the general formula (1), where three of $R_1$, $R_2$, $R_3$, and $R_4$ is a hydrogen atom, and other one of $R_1$, $R_2$, $R_3$, and $R_4$ is a group including a straight-chain hydrocarbon group having 10 or more carbon atoms in the general formula (2), where $R_1$ is a group including a straight-chain hydrocarbon group having 10 or more carbon atoms, and n is 0 or 1 in the general formula (3), and where $R_1$ is a group including a straight-chain hydrocarbon croup haying 10 or more carbon atoms in the general formula (4)

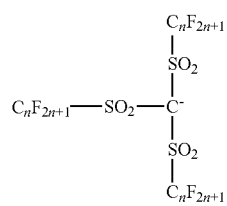
General formula (1)

where n is an integer of from 0 to 6 in the general formula (1).

6. The ionic liquid according to claim 5, wherein the conjugate base is represented by the following structural formula (1):

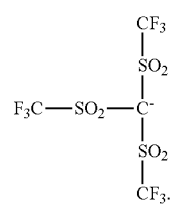
Structural formula (1)

7. The ionic liquid according to claim 5, wherein the hydrocarbon group is an alkyl group.

8. The lubricant according to claim 1, wherein the ionic liquid is represented by any one of the following general formulae (3) and (4):

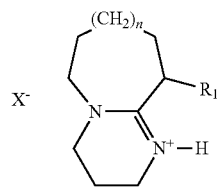
General formula (3)

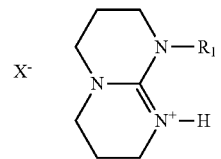
General formula (4)

where R1 is a group including a straight-chain hydrocarbon group having 10 or more carbon atoms, and n is 0 or 1 in the general formula (3), and where R1 is a group including a straight-chain hydrocarbon group having 10 or more carbon atoms in the general formula (4).

9. The ionic liquid according to claim 5, wherein the ionic liquid is represented by any one of the following general formulae (3) and (4):

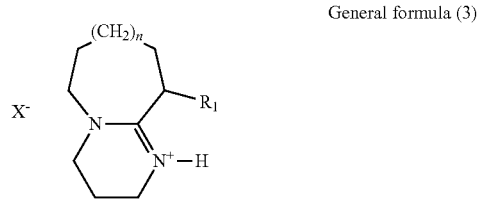
General formula (3)

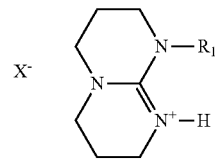
General formula (4)

where $R_1$ is a group including a straight-chain hydrocarbon group having 10 or more carbon atoms, and n is 0 or 1 in the general formula (3), and where $R_1$ is a group including a straight-chain hydrocarbon group having 10 or more carbon atoms in the general formula (4).

* * * * *